(12) United States Patent
Hiratsuka et al.

(10) Patent No.: US 11,281,979 B2
(45) Date of Patent: Mar. 22, 2022

(54) MODEL IDENTIFICATION SYSTEM, MODEL IDENTIFICATION METHOD, AND MODEL IDENTIFICATION PROGRAM

(71) Applicant: Informetis Corporation, Tokyo (JP)

(72) Inventors: Nobuaki Hiratsuka, Tokyo (JP); Masato Ito, Tokyo (JP)

(73) Assignee: Informetis Corporation, Tokyo (JP)

( * ) Notice: Subject to any disclaimer, the term of this patent is extended or adjusted under 35 U.S.C. 154(b) by 915 days.

(21) Appl. No.: 16/071,754

(22) PCT Filed: Jan. 23, 2017

(86) PCT No.: PCT/JP2017/002181
§ 371 (c)(1),
(2) Date: Jul. 20, 2018

(87) PCT Pub. No.: WO2017/126705
PCT Pub. Date: Jul. 27, 2017

(65) Prior Publication Data
US 2019/0012604 A1   Jan. 10, 2019

(30) Foreign Application Priority Data
Jan. 21, 2016   (JP) .............................. JP2016-009623

(51) Int. Cl.
*G06N 5/04*     (2006.01)
*G06Q 50/06*    (2012.01)
(Continued)

(52) U.S. Cl.
CPC .............. *G06N 5/04* (2013.01); *G06N 20/00* (2019.01); *G06Q 50/06* (2013.01); *H02J 13/00* (2013.01);
(Continued)

(58) Field of Classification Search
None
See application file for complete search history.

(56) References Cited

U.S. PATENT DOCUMENTS

| | | | |
|---|---|---|---|
| 2012/0004871 A1 | 1/2012 | Tsao et al. | |
| 2014/0100805 A1 | 4/2014 | Takagi et al. | |
| 2016/0154038 A1 | 6/2016 | Toizumi et al. | |

FOREIGN PATENT DOCUMENTS

| | | |
|---|---|---|
| JP | 2013-009500 A | 1/2013 |
| WO | 2015/008645 A1 | 1/2015 |
| WO | 2015/097845 A1 | 7/2015 |

OTHER PUBLICATIONS

Luo, et al., Feature Extraction and Recognition for Human Action Recognition, Doctoral Thesis, University of Tennessee, 2014, pp. 1-143 (Year: 2014).*

(Continued)

*Primary Examiner* — Wilbert L Starks
(74) *Attorney, Agent, or Firm* — DLA Piper LLP (US)

(57) ABSTRACT

A model identification system includes a device information acquiring unit that acquires device information used to identify a model of an electric device, an operation extracting unit that extracts data of a predetermined operation section, a feature quantity extracting unit that extracts a parameter used to identify the electric device, and a model identifying unit that identifies a model of an electric device, wherein the feature quantity extracting unit performs a machine learning process by sampling the data of the predetermined operation section extracted from the operation extracting unit a plurality of times, extracts a parameter corresponding to each sampling, and extracts a parameter appropriate to identify a model among a plurality of sampled parameters.

12 Claims, 7 Drawing Sheets

(51) Int. Cl.
*H02J 13/00* (2006.01)
*G06N 20/00* (2019.01)
(52) U.S. Cl.
CPC .............. *Y02B 70/30* (2013.01); *Y04S 20/242* (2013.01); *Y04S 20/244* (2013.01)

(56) References Cited

OTHER PUBLICATIONS

Shen, et al., Universal Feature Extraction for Traffic Identification of the Target Category, PLoS ONE 11 (11), 2016, pp. 1-22 (Year: 2016).*
Decision of Rejection dated Mar. 3, 2020, of counterpart Japanese Application No. 2016-009623, along with an English translation.
Office Action dated Mar. 12, 2020, of counterpart European Application No. 17741582.5.
The Extended European Search Report dated Jun. 7, 2019 of counterpart European Application No. 177415825.5.
Hisahide Nakamura et al., "Load Monitoring System of Electric Appliances Based on Hidden Markov Model", *Denki Gakkai Ronbunshi. B, Denryoku, Enerugi Bumonshi—Transactions of the Institute of Electrical Engineers of Japan, B., JP*, (Jan. 1, 2006), vol. 126, No. 12, doi:10:1541/ieeejpes.126.1223, ISSN 0385-4213, pp. 1223-1229, XP055356058.
Hannu Pihala, "Non-intrusive appliance load monitoring system based on a modern kWh-meter", Non-intrusive appliance load monitoring system based on a modern kWh-meter, Espoo, ISBN 978-951-38-5247-4, (May 31, 1998), URL: http://citeseerx.ist.psu.edu/viewdoc/download?doi=10.1.1.428.4015&rep=rep1&type=pdf, (May 24, 2019), XP055591778 [T] * Chapter 4 ("Load Identification Algorithms"), pp. 27-40.
Hyungsul Kim et al., "Unsupervised Disaggregation of Low Frequency Power Measurements", SIAM International Conference on Data Mining 2011, (Apr. 28, 2011), XP055077652.
Summons to Attend Oral Proceedings dated Jul. 23, 2020, of counterpart European Application No. 17741582.5.
The Notice of Reasons for Refusal dated Oct. 6, 2020, of counterpart Japanese Patent Application No. 2016-009623, along with an English translation.
The Decision of Refusal dated May 11, 2021, of counterpart Japanese Patent Application No. 2016-009623, along with an English translation.

* cited by examiner

MODEL IDENTIFICATION SYSTEM, MODEL IDENTIFICATION METHOD, AND MODEL IDENTIFICATION PROGRAM

TECHNICAL FIELD

This disclosure relates to a model identification system, a model identification method, and a model identification program and, more particularly, to a model identification system, a model identification method, and a model identification program specifying a model of an electric device used in a house from time series data of a current waveform and electric power of the electrical device.

BACKGROUND

In recent years, a technology of extracting a high-frequency component of a current waveform in an electric lamp line by measuring a current flowing through a main part of a distribution board and specifying an electrical device operating at a timing at which the current waveform is acquired has been proposed (for example, see PCT Publication No. 2015/097845).

For example, WO '845 describes that operation statuses of electrical devices are estimated by analyzing information of currents and voltages supplied to one or more electrical devices, and states of the electrical devices are evaluated on the basis of a result of the estimation.

However, for example, in an electrical device such as an air conditioner or a washer used in a house, there are many instances in which there is no large difference in instantaneous current waveform between manufacturers, and it is difficult to identify an electrical device by specifying a manufacturer name and a model name.

It could therefore be helpful to provide a model identification system, a model identification method, and a model identification program capable of appropriately identifying a retrieved electrical device by specifying a manufacturer name and a model name of the electrical device.

SUMMARY

We thus provide:

A model identification system includes: a device information acquiring unit that acquires device information used for identifying a model of an electric device; an operation extracting unit that extracts data of a predetermined operation section on the basis of the device information acquired by the device information acquiring unit; a feature quantity extracting unit that extracts a parameter used for model identification of the electric device on the basis of the data of the predetermined operation section of the electric device that is extracted by the operation extracting unit; and a model identifying unit that identifies a model of a used electric device on the basis of the parameter of the electric device that is extracted by the feature quantity extracting unit, wherein the feature quantity extracting unit performs a machine learning process by sampling the data of the predetermined operation section that is extracted from the operation extracting unit a plurality of times, extracts a parameter corresponding to each sampling, and extracts a parameter that is appropriate for identifying a model among a plurality of sampled parameters.

The parameter may include a first parameter for specifying the electric device and a second parameter representing an electric device that is a comparison target of the electric device, and the model identifying unit may identify the model of the electric device by comparing the first parameter with the second parameter.

The model identification system may additionally have a direct detection function of directly acquiring changed parts of time series data of a current waveform and electric power that are unique to a category of the electric device or an electric power/current waveform disaggregating function of decomposing time series data of a total current waveform and total electric power supplied to a plurality of electric devices into components of the plurality of electric devices and disaggregating and acquiring time series data of a current waveform and electric power corresponding to a category of a specific electric device, and the model identifying unit may analyze the time series data of the current waveform and the electric power of the category of the electric device using the direct detection function or the electric power/current waveform disaggregating function and identify features of the time series data of the current waveform and the electric power corresponding to a model of a target electric device.

The model identifying unit may evaluate a degree of similarity between the first parameter and the second parameter.

The device information acquiring unit may additionally acquire first device information including time series data of a current waveform and electric power of an operating electric device among time series data of a total current waveform and total electric power of the electric device that is measured by a distribution board and second device information including time series data of a current waveform and electric power of another electric device that is a comparison target of the electric device, and the feature quantity extracting unit may extract the first parameter corresponding to each electric device on the basis of the first device information and extract the second parameter on the basis of the second device information.

In addition, the model identifying unit may calculate a degree of similarity between parameters on the basis of the first parameter and the second parameter acquired by the feature quantity extracting unit, specify the electric device having a highest degree of similarity among the calculated degrees of similarity, and identify a model of the specified electric device as the target electric device.

A model identification method includes: a device information acquiring step of acquiring device information used for identifying a model of an electric device; an operation extracting step of extracting data of a predetermined operation section on the basis of the device information acquired in the device information acquiring step; a feature quantity extracting step of extracting a parameter used for identification of the electric device on the basis of the data of the predetermined operation section of the electric device that is extracted in the operation extracting step; and a model identifying step of identifying a model of a used electric device on the basis of the parameter of the electric device that is extracted in the feature quantity extracting step, wherein, in the feature quantity extracting step, a machine learning process is performed by sampling the data of the predetermined operation section that is extracted from the operation extracting step a plurality of times, a parameter corresponding to each sampling is extracted, and a parameter that is appropriate for identifying a model among a plurality of sampled parameters is extracted.

A model identification program causes a computer to have: a device information acquiring function of acquiring device information used for identifying a model of an electric device; an operation extracting function of extracting data of a predetermined operation section on the basis of the device information acquired using the device information acquiring function; a feature quantity extracting function of extracting a parameter used for identification of the electric device on the basis of the data of the predetermined operation section of the electric device that is extracted using the operation extracting function; and a model identifying function of identifying a model of a used electric device on the basis of the parameter of the electric device that is extracted using the feature quantity extracting function, wherein the feature quantity extracting function performs a machine learning process by sampling the data of the predetermined operation section that is extracted from the operation extracting function a plurality of times, extracts a parameter corresponding to each sampling, and extracts a parameter that is appropriate for identifying a model among a plurality of sampled parameters.

According to our model identification system, model identification method, and model identification program, there is an effect of being capable of identifying a retrieved electrical device by specifying a manufacturer name and a model name of the electrical device.

REFERENCE SIGNS LIST

Figure 1:
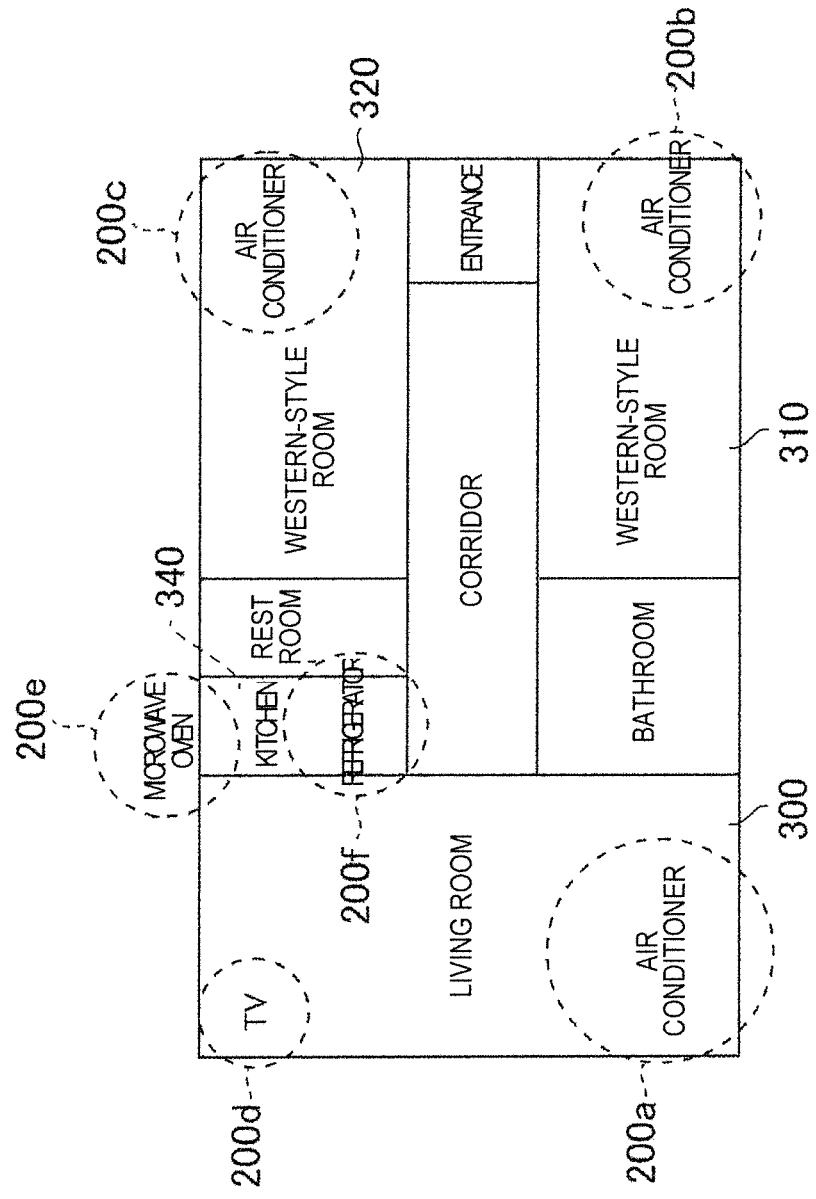
FIG. 1 is a diagram illustrating one example of an installation status of electrical devices in a house.

100 Model identification system
110 Device information acquiring unit
120 Electric appliance detecting unit
130 Operation extracting unit
140 Feature quantity extracting unit
150 Model identifying unit
410 Sensor
420 Distribution board

DETAILED DESCRIPTION

Examples of our model identification systems will be described with reference to the drawings.

Example 1

The model identification system 100 can identify a model name, a manufacturer name, a product name, and the like of an electrical device. In the following description, an instance in which electric devices, in other words, electric appliances used in a house, are identified will be described as an example.

FIG. 1 is a diagram illustrating one example of an installation status of electric appliances 200 in a house. As illustrated in FIG. 1, a TV set 200d (television set) and an air conditioner 200a are installed in a living room 300, and a microwave oven 200e and a refrigerator 200f are installed in a kitchen 340. In addition, in the example illustrated in FIG. 1, air conditioners 200b and 200c are respectively installed in western-type rooms 310 and 320.

The model identification system 100 has a function of extracting features of electric appliances from time series data of current waveforms and electric power of the plurality of electric appliances described above installed in the rooms in the house and performing model identification of specifying models, manufacturer names, product names and the like of the electric appliances on the basis of the features.

According to the model identification system 100, for example, time series data of a current waveform and electric power when the microwave oven operates and changes in the time series data of the current waveform and the electric power before and after the air conditioner operates can be acquired and, accordingly, features that are unique to each electric appliance can be extracted.

Figure 2:
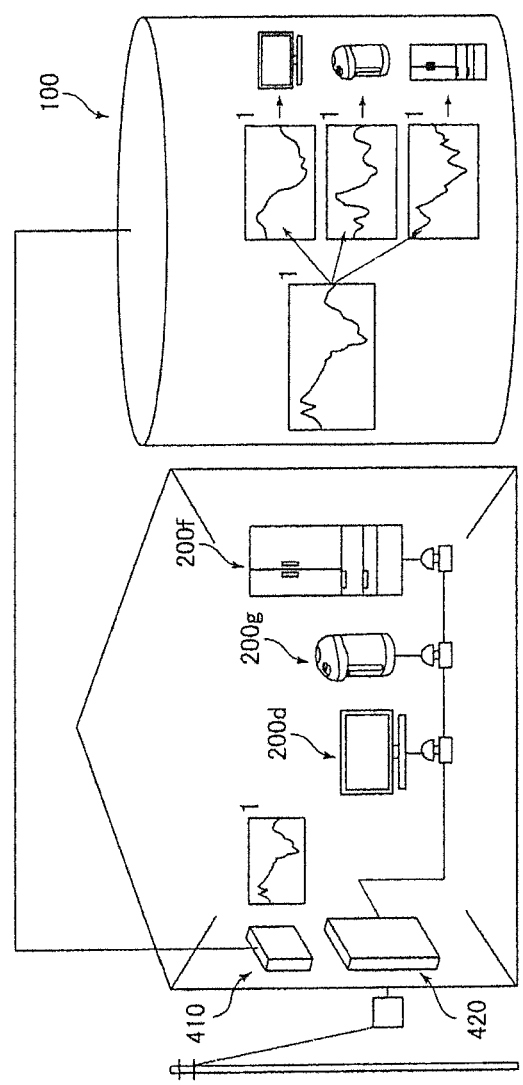
FIG. 2 is a schematic view of a model identification system according to Example 1.

Next, an installation example of the model identification system 100 will be described with reference to the drawings. FIG. 2 is a schematic view of the model identification system 100 according to Example 1.

The model identification system 100 according to Example 1 measures all the time series data of current waveforms and electric power supplied from the distribution board 1 to the plurality of electric appliances 200 using a sensor 410 and transmits the measurement data to the model identification system 100. The sensor 410 and the model identification system 100 are interconnected through a communication line, and the model identification system 100 can extract time series data of a current waveform and electric power of each electric appliance. In addition, the transmission may be performed using radio communication. FIG. 2 illustrates an example in which a TV set 200d, a refrigerator 200f, and an electric pot 200g are present as electric appliances 200.

Hereinafter, electric appliances such as the air conditioners 200a to 200c, the TV set 200d and the like will be collectively referred to as an electric appliance 200.

Figure 3:
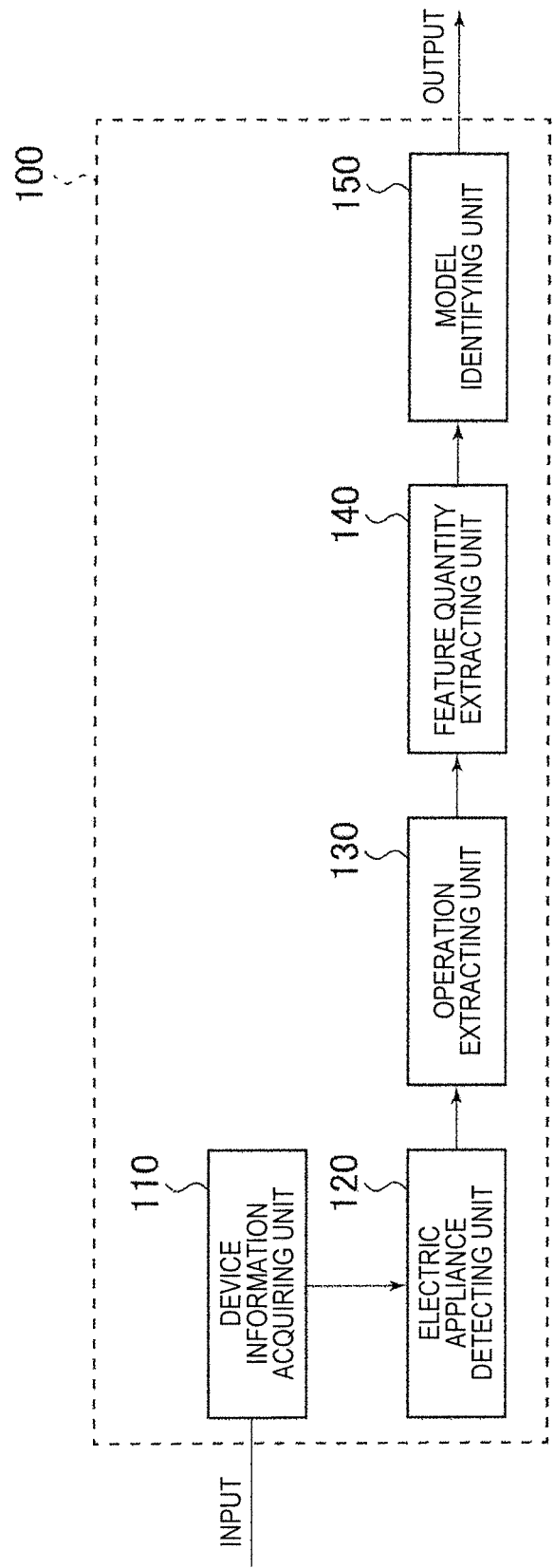
FIG. 3 is a block diagram illustrating one example of the configuration of a main part of a model identification system according to Example 1.

FIG. 3 is a block diagram illustrating one example of the configuration of a main part of a model identification system according to Example 1.

The model identification system 100 identifies an electric appliance through a model data acquiring process step of acquiring model data that is a comparison target when the model of the electric appliance 200 is identified, an electric appliance extracting process step of extracting features of the electric appliance 200 in the house, and a model identifying process step of identifying models of electric appliances used in the house on the basis of the model data acquiring process step and the electric appliance extracting process step.

An example in which the model identification system 100 includes a device information acquiring unit 110 (device information acquiring function), an electric appliance detecting unit 120 (electric appliance detecting function), an operation extracting unit 130 (operation extracting function), a feature quantity extracting unit 140 (feature quantity extracting function), and a model identifying unit 150 (model identifying function) is illustrated in FIG. 3.

First, the model data acquiring process step will be described.

Model Data Acquiring Process Step

The device information acquiring unit 110 acquires data of a plurality of electric appliances that are comparison targets when a model of an electric appliance 200 used in the house is identified. More specifically, time series data of a current waveform and electric power of each of the electric appliances that are comparison targets is input to the device information acquiring unit 110 as device information (second device information). To input data to the device information acquiring unit 110, for example, data is measured using a measurement sensor such as an ampere meter or a watt-hour meter, and the measured data is input. Various kinds of data of a target electric appliance, for example, time series data of current waveforms and electric power of microwave functions of all the models of microwave ovens, is input to the device information acquiring unit 110. The device information acquiring unit 110 acquires device information through a communication line such as a mobile telephone network or the like.

The operation extracting unit 130 extracts data of a specific operation section of an electric appliance from time series data of a current waveform and electric power used to identify a model of the electric appliance which is a comparison target acquired by the device information acquiring unit 110. The data of a specific operation section represents data of the specific operation section having a specific operation mode as its start point in accordance with the features of an electric appliance for effectively identifying a model of the electric appliance 200. The operation extracting unit 130 extracts the data of the specific operation section having the specific operation mode as its start point. The specific operation mode represents an operation part in which a different point is distinctively represented among time series data of current waveforms and electric power between models in model identification for an electric appliance 200. The operation extracting unit 130, for example, extracts time series data of current waveforms and electric power before and after start of the operation of a microwave function of all models of microwave ovens.

The feature quantity extracting unit 140 extracts a parameter used for model identification that becomes a feature point in identifying a model from time series data of a current waveform and electric power of a specific operation section of an electric appliance which is a comparison target extracted by the operation extracting unit 130 as a second parameter. To effectively use the second parameter having a specific operation mode as its start point when the model of the electric appliance 200 is identified, by using a machine learning function included in the feature quantity extracting unit 140, a parameter conversion function that is necessary to specify a model of an electric appliance which is a target is derived from time series data of current waveforms and electric power of specific operation sections of various models. Then, a parameter that is effective in specifying a model is extracted, and a second model parameter appropriate to identify a model is specified for each model. In other words, the feature quantity extracting unit 140 converts time series data of a current waveform and electric power into a form in which a model of a target category (for example, a microwave oven, a washer or the like) of an electric appliance can be easily identified. The feature quantity extracting unit 140 converts data into a form in which a model of an electric appliance can be easily identified, for example, it can be easily identified whether a microwave oven is "microwave oven A" or "microwave oven B." More specifically, the feature quantity extracting unit 140 converts data into a form in which data of various models of a target category (for example, a microwave oven, a washer or the like) of electric appliances can be easily identified by applying the parameter conversion function to be described later to the data and outputting it as a second parameter.

The feature quantity extracting unit 140 samples the time series data acquired by the device information acquiring unit 110 a plurality of times by using a machine learning function and extracts a second parameter appropriate to identify a model from among a plurality of sampled parameters.

The machine learning function has a component decomposing function of decomposing time series data into components. The machine learning function has a function of decomposing time series data on the basis of the component decomposing function and converting the time series data into a second parameter that characterizes a different point between models of electric appliances 200. The component decomposing function decomposes time series data into a common component between models and a unique component.

The conversion of data into a parameter that characterizes a different point between models using the component decomposing function, for example, is executed using a principal component analysis (PCA), a non-negative matrix factorization (NMF) method by projected gradient, a factor analysis (FA) method, a fastICA method, an akaLSA method, a sparse coding method, a dictionary learning method or the like.

In addition, the machine learning function has a regression analysis function of analyzing a distinctive component of time series data. The machine learning function analyzes time series data on the basis of the regression analysis function and can extract a component that is important in identifying a model of an electric appliance 200.

The extraction of an important component to identify a model using the regression analysis function, for example, is executed using a gradient boosting method, an aka extra-trees method, a random forest method or the like.

As described above, the feature quantity extracting unit 140 can convert data into a second parameter that characterizes different points between models using the component decomposing function and extract an important component for model identification. For this reason, the feature quantity extracting unit 140 can extract a second parameter appropriate to identify a model among a plurality of sampled second parameters.

Next, the electric appliance extracting process step will be described.

Electric Appliance Extracting Process Step

The device information acquiring unit 110 acquires device information as time series data of a total current waveform and total electric power of electric appliances 200 used in a house in addition to second device information of each of the electric appliances that are comparison targets described above. The device information acquiring unit 110 acquires the device information from a lamp panel of a house distribution board 1. More specifically, the device information acquiring unit 110 acquires device information of all the electric appliances 200 installed in the house at predetermined intervals.

The device information, for example, represents information used to specify a use state or a usage amount of electric power of an electric appliance such as time series data of a current waveform and electric power. The device information acquiring unit 110 measures time series data of a total current waveform and total electric power supplied from the lamp panel of the house distribution board 1 using a sensor installed in the house. The device information is stored in a memory (not illustrated in the drawings) included in the device information acquiring unit 110. In addition, the device information may be stored in a storage unit (not illustrated in the drawings) that is additionally included in the model identification system 100.

The electric appliance detecting unit 120 detects device information (first device information) used to identify models of the electric appliances 200 from the time series data of the total current waveform and the total electric power acquired by the device information acquiring unit 110. More specifically, the electric appliance detecting unit 120 has a direct detection function of detecting time series data of a current waveform and electric power of an electric appliance 200 installed in the house for the time series data of the total current waveform and the total electric power acquired by the device information acquiring unit 110. For example, the electric appliance detecting unit 120 can detect time series data of a current waveform and electric power of an electric appliance 200 from an operation start time point to an operation end time point on the basis of a unique feature of the electric appliance by using the direct detection function.

In addition, instead of the direct detecting function of detecting time series data of a current waveform and electric power of an electric appliance 200 used in the house from the time series data of a total current waveform and total electric power, the electric appliance detecting unit 120 may have an electric power/current waveform disaggregating function of decomposing time series data of current waveforms and electric power of a plurality of electric appliances used in the house acquired from the lamp panel of the house distribution board 1 into a plurality of components, disaggregating the components as information of a plurality of electric appliances, and acquiring time series data of a current waveform and electric power corresponding to a specific electric appliance 200 from among them. According to the electric power/current waveform disaggregating function, for example, by using a factorial hidden Markov model (HMM) technology, time series data of a total current waveform and total electric power used in a house can be decomposed into a plurality of components and can be disaggregated as information of a plurality of electric appliances.

By using the direct detection function or the electric power/current waveform disaggregating function, the electric appliance detecting unit 120 acquires device information (first device information) as time series data of a current waveform and electric power of each category (for example, a microwave oven, a washer or the like) of target electric appliances from time series data of a total current waveform and total electric power of all the electric appliances installed in the house. The electric appliance detecting unit 120 has the direct detection function of detecting time series data of current waveforms and electric power of a target category (for example, a microwave oven, a washer or the like) of electric appliances installed in the house on the basis of electric appliance waveforms that are unique to the electric appliances or the electric power/current waveform disaggregating function of disaggregating time series data of a total current waveform and total electric power flowing through the distribution board using a disaggregation technology and acquiring time series data of a current waveform and electric power of the target category (for example, a microwave oven, a washer or the like) of electric appliances.

In the direct detection function, by directly applying "information evaluating different points between categories of electric appliances" to a measured value acquired from the lamp panel 1 of the house distribution board, time series data of a current waveform and electric power of each category (for example, a microwave oven, a washer or the like) of target electric appliances is acquired. In the electric power/current waveform disaggregating function, by applying "information evaluating different points between categories of electric appliances" to a result of disaggregation of the time series data of the total current waveform and the total electric power flowing through the distribution board using a disaggregation technology, time series data of a current waveform and electric power of a category (for example, a microwave oven, a washer or the like) of a target electric appliance is acquired. In accordance with the use, one of the direct detection function and the electric power/current waveform disaggregating function is selected as being applied for acquiring data of target electric appliances. By applying the direct detection function or the electric power/current waveform disaggregating function, data of an operation part that is unique to an electric appliance is acquired.

Figure 4:
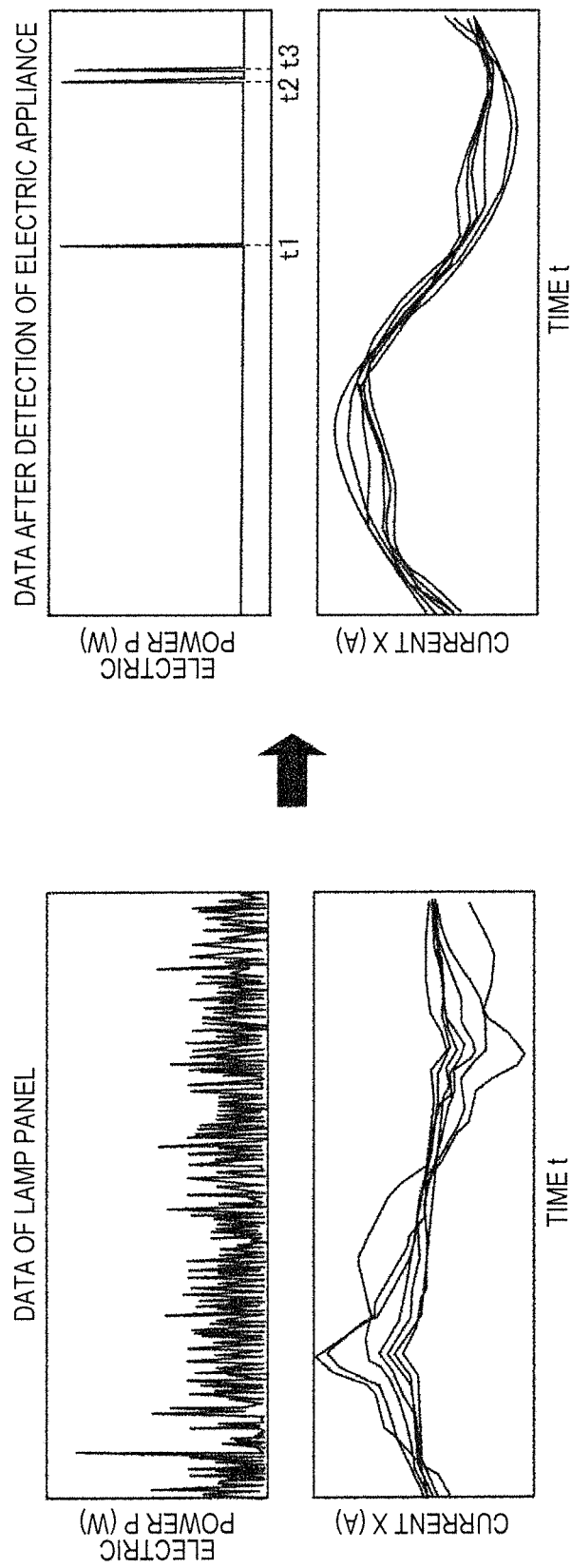
FIG. 4 illustrates graphs representing time series data of a current waveform and electric power in a lamp panel of a distribution board according to Example 1.

Next, a method of detecting time series data of current waveforms and electric power of electric appliances 200 used in a house using the direct detection function or the electric power/current waveform disaggregating function included in the electric appliance detecting unit 120 will be described with reference to the drawings. FIG. 4 illustrates graphs representing time series data of a current waveform and electric power in the lamp panel of the house distribution board 1.

Left diagrams illustrate time series data of a total current waveform and total electric power of all the electric appliances installed in a house that are measured by the lamp panel of the house distribution board 1. In addition, right diagrams illustrate results of detection of only time series data of a current waveform and electric power of a specific electric appliance 200 among operating electric appliances among the time series data of the total current waveform and the total electric power acquired by applying the direct detection function or the electric power/current waveform disaggregating function. In this example, results of detection of time series data of a current waveform and electric power of a washer among time series data of a total current waveform and total electric power of all the electric appliances are illustrated as an example.

In the lamp panel of the house distribution board 1, for example, data corresponding to one week is continuously measured at every predetermined period and can be output as graph data. The horizontal axis represents time t, and the vertical axes respectively represent a current value X and an electric power value P. By applying the direct detection function included in the electric appliance detecting unit 120 to the data measured in this way, time series data of a current waveform and electric power of electric appliances 200 of a target category such as a microwave oven, a washer or the like can be detected from features of the time series data of a current waveform and electric power that are unique to each category of electric appliances. In addition, by applying the electric power/current waveform disaggregating function, the electric appliance detecting unit 120 disaggregates time series data of current waveforms and electric power flowing through electric appliances from the time series data of current waveforms and electric power flowing through the main part of the house distribution board 1 using a disaggregation technology and can detect time series data of a current waveform and electric power of each type of electric appliance 200. In this way, the electric appliance detecting unit 120 can extract the time series data of a current waveform and electric power of electric appliances 200 of a target category such as a microwave oven, a washer or the like. According to the electric power/current waveform disaggregating function, data of all the electric appliances installed in the house can be disaggregated, and data of a specific category (for example, a microwave oven, a washer or the like) of electric appliances that are targets among them can be extracted.

The right diagrams in FIG. 4 illustrate an example in which a power value P rises at a time t1, a time t2, and a time t3, and electric appliances are used three times a week. The electric appliance detecting unit 120 may also directly detect data from data corresponding to one week illustrated in the left drawings by applying the direct detection function to data from operation start to operation end illustrated in the right diagrams. Alternatively, the electric appliance detecting unit 120 may disaggregate and detect data by applying the electric power/current waveform disaggregating function. When the power consumption is relatively low and set as having a regulated value or less, it is preferable to use the electric power/current waveform disaggregating function in extracting time series data of a current waveform and electric power of a specific operating electric appliance. On the other hand, for an electric appliance having high power consumption, time series data of a current waveform and electric power may be directly detected without using the electric power/current waveform disaggregating function. When a model is identified by directly acquiring time series data of a current waveform and electric power of an electric appliance using the direct detection function, there is an effect of decreasing the calculation cost.

In this way, the electric appliance detecting unit 120, for example, by using the features of electric appliances of various categories such as a microwave oven, a washer and the like, in other words, "information evaluating different points between categories of electric appliances," can acquire time series data of a current waveform and electric power of each category of target electric appliances such as a microwave oven, a washer or the like that is a target.

Then, the electric appliance detecting unit 120 delivers the detected time series data of current waveforms and electric power used to identify a model of the electric appliance 200 to the operation extracting unit 130.

The operation extracting unit 130 narrows down time series data of a current waveform and electric power for each category of electric appliances 200 detected by the electric appliance detecting unit 120 into a specific operation section that is effective in identifying a model and extracts time series data of current waveforms and electric power of electric appliances 200 of a target category. For example, when a target category of electric appliances is a microwave oven, an operation section in which different points distinctively appear for each model of a microwave oven is extracted. More specifically, data is narrowed down into a specific operation section in which a rise tendency of electric power, a change in the current waveform and the like are different for each model in a target category (for example, a microwave oven, a washer or the like) of electric appliances and acquired. Data of a specific operation section represents data of the specific operation section having a specific operation mode as its start point in accordance with features of electric appliances to effectively identify models of electric appliances 200. The operation extracting unit 130 extracts data of the specific operation section having the specific operation mode as its start point. The specific operation mode represents an operation part in which different points distinctively appear between models of an electric appliance 200 in time series data of a current waveform and electric power.

In more detail, the specific operation section represents a section in which a difference in tendency of time series data of a current waveform and electric power between models in a target category of electric appliances is likely to occur. For example, the specific operation section represents a section in which, for a specific electric appliance, when the electric appliance operates, a tendency of time series data of a current waveform and electric power distinctively appears compared to that of an electric appliance of a different model of the same category.

In addition, the specific operation mode, for example, represents a mode that represents an operation of an "microwave function" when an electric-heater-attached microwave oven is used as a microwave oven and an "oven function" when the electric-heater-attached microwave oven is used as a gas oven in which an operation of the electric heater-attached microwave oven among electric appliances 200 is to be identified. In addition, for a washer, a mode representing an operation of a part other than an operation part of a dryer may be the specific operation mode.

In addition, data of a specific operation section having a specific operation mode at its start point, for example, for a category of electric appliances that operate periodically, represents data of a period from the start of one operation to the end thereof and, for a category of electric appliances having strong distinctiveness for each model before and after the start of an operation, data of several tens of seconds before and after the start of the operation.

As described above, the operation extracting unit 130 narrows down time series data of a current waveform and electric power of a specific operation section into a specific operation section that is effective in identifying a model from the time series data of the current waveform and electric power of electric appliances extracted by the electric appliance detecting unit 120 and extracts the data. For example, when a category of target electric appliances is the microwave oven, data of several tens of seconds before and after an operation of the microwave function is extracted from the time series data of a current waveform and electric power of the microwave oven extracted by the electric appliance detecting unit 120 as "information evaluating different points of the microwave oven."

Then, the operation extracting unit 130 delivers the extracted data of the specific operation section to the feature quantity extracting unit 140.

The feature quantity extracting unit 140 extracts a parameter used for model identification that is a feature point in identifying a model from the time series data of the current waveform and electric power used for identifying the model, which is extracted by the operation extracting unit 130, as a first parameter. Then, to effectively use the first parameter extracted from the specific operation section when the model of the electric appliance 200 is identified, an effective parameter is extracted using the machine learning function included in the feature quantity extracting unit 140, and a first model parameter that is appropriate to identify a model can be specified. More specifically, in the model data acquiring process step, a parameter conversion function calculated by applying the machine learning function is applied to the time series data of the current waveform and the electric power of the specific operation section of electric appliances 200 of a target category, which is extracted by the operation extracting unit 130, and the data is converted into a form in which a model can be easily identified and is output as a first parameter. In this way, by focusing on the specific operation section of the category (for example, a microwave oven, a washer or the like) of a target electric appliance that is a target extracted by the operation extracting unit 130, the feature quantity extracting unit 140 can extract information for identifying a model among the microwave ovens as a first parameter.

The machine learning function samples the data of a specific operation section, which is extracted by the operation extracting unit 130, a plurality of times and extracts a first parameter that is appropriate to identify a model among a plurality of sampled parameters.

In addition, a first parameter that is effective in identifying a model may be manually input on the basis of features of an electric appliance 200, and the parameter that is appropriate to identify a model may be extracted for each electric appliance as a first model parameter.

Alternatively, by combining the above-described first model parameter specified using the machine learning function and the above-described first model parameter input manually, a first model parameter that is appropriate to identify a model may be extracted. This extraction is executed by the feature quantity extracting unit 140.

In this way, when the first parameter is manually input, and a first model parameter that is appropriate to identify a model is extracted for each electric appliance, similar to the first parameter, the second parameter may be manually input, and a second model parameter that is appropriate to identify a model may be extracted for each electric appliance.

Then, by combining the second model parameter specified using the machine learning function and the above-described second model parameter input manually, a second model parameter that is appropriate to identify a model may be extracted. This extraction is executed by the feature quantity extracting unit 140.

As described above, by extracting a model parameter by combining a model parameter specified by the machine learning function and a model parameter designated through manual input, there is an effect of more appropriately identifying a model of a target electric appliance.

Next, the model identifying process step will be described.

Model Identifying Process Step

In the model identifying process step, a model of a target electric appliance is identified on the basis of feature quantities of a plurality of kinds of electric appliances, which are acquired and extracted in the model data acquiring process step and the electric appliance extracting process step and are comparison targets, and feature quantities of an electric appliance 200 that is used in the house. The identification of a model is executed by the model identifying unit 150 included in the model identification system 100. By comparing the first parameter and the second parameter, which are acquired and extracted in the model data acquiring process step and the electric appliance extracting process step, a model of the electric appliance 200 used in the house is identified. More specifically, a degree of similarity between the parameters is calculated and compared to a threshold that is a criterion to determine whether two appliances are the same appliance or not.

The degree of similarity, for example, is calculated using a likelihood and a vector distance between parameters. In addition, a means of calculating the degree of similarity is not limited to the calculation of a likelihood or a vector distance. The degree of similarity may be calculated using a Euclidean distance, a Mahalanobis distance, a Manhattan distance, a Chebyshev distance, a Minkowski distance, a cosine (Cos) similarity, a Pearson's correlation coefficient, a deviation pattern similarity or the like, and the degree of similarity may be calculated by combining some thereof.

By configuring time series data as a model parameter using hidden Markov models (HMMs), a likelihood can be calculated. An HMM is a data model that represents a sequence as transitions among states having an occurrence model according to a probability distribution and calculates a likelihood in accordance with the probability distribution. The HMM has a characteristic of being strong against noise and thus is effective as a model identifying process of analyzing time series data generated in accordance with an electric appliance and executing model identification.

For example, in identifying a model of an electric appliance 200 used in a house, degrees of similarity for a plurality of kinds of electric appliances that are comparison targets are calculated. For example, when the degree of similarity is calculated using a vector distance between parameters, an electric appliance having a shortest vector distance is output as the electric appliance 200. Alternatively, when the likelihood has a predetermined value or more, the electric appliance 200 may be configured to be output as a candidate for a model of a target electric appliance 200. In such a case, it is preferable for the device information acquiring unit 110 to acquire a large amount of electric appliance data that is a comparison target in advance.

As described above, according to the model identification system 100 of this example, an electric appliance that is appropriate for a parameter model of the same electric appliance can be detected and, accordingly, a marked effect of enabling a model to be identified with high accuracy is acquired.

Next, a method of calculating a parameter using the model identification system 100 according to an example will be described more specifically.

Method of Calculating Parameter

The time series data of a current waveform and electric power of an electric appliance that is a comparison target when an electric appliance 200 is to be identified is represented by Equations (1) and -(2). "A" represents current waveform data of an operation part of an electric appliance that is a comparison target, and "S" represents electric power data of an operation part of the electric appliance that is the comparison target. In addition, a time from the start of an operation of the electric appliance to the end of the operation is represented as endτ. The data is acquired by the device information acquiring unit 110. The device information acquiring unit 110 acquires data of various models of a category (for example, a microwave oven, a washer or the like) of a target electric appliance.

$$A = \{A_0, A_1, \ldots, A_{end\tau}\} \quad (1)$$

$$S = \{S_0, S_1, \ldots, S_{end\tau}\} \quad (2)$$

Equations (1) and (2) respectively represent time series data of a current waveform and time series data of electric power for endτ seconds from "0." A current waveform ($A_0, A_1, \ldots, A_{end\tau}$) for each second is configured of n parameters and represented by Equation (3).

$$A_\tau = \{a_0, a_1, \ldots, a_n\} \quad (n: \text{integer}) \quad (3)$$

The data of the model is input to the operation extracting unit 130.

The time series data of a current waveform and electric power of an electric appliance, which is a comparison target when the electric appliance 200 is to be identified, in a specific operation mode is represented by Equations (4) and (5). Such data is extracted by the operation extracting unit 130. A' represents current waveform data of an electric appliance that is a comparison target in a specific operation section, and S' represents electric power data of the electric appliance that is a comparison target in a specific operation section.

$$A'=\{A_{\tau 1},A_{\tau 1+1},\ldots,A_{\tau 2},A_{\tau 3},A_{\tau 3+1},\ldots,A_{\tau 4}\} \quad (4)$$

$$S'=\{S_{\tau 1},S_{\tau 1+1},\ldots,S_{\tau 2},S_{\tau 3},S_{\tau 3+1},\ldots,S_{\tau 4}\} \quad (5)$$

On the basis of the time series data of the current waveform and the electric power of the electric appliance that is a comparison target in a specific operation section, which is output from the operation extracting unit 130, a second parameter that is a feature in identifying a model is extracted. This extraction is executed by the feature quantity extracting unit 140, and the second parameter Q of the electric appliance that is a comparison target when the electric appliance 200 is to be identified is represented by Equation (6). A result of the extraction is input from the feature quantity extracting unit 140 to the model identifying unit 150. In the following Equation (6), F represents a parameter conversion function. More specifically, by applying the machine learning function included in the feature quantity extracting unit 140, a function F required to specify a model is derived from time series data of current waveforms and electric power of various models in a specific operation section. By inputting time series data of a current waveform and electric power of a category (for example, a microwave oven, a washer or the like) of a target electric appliance in a specific operation section to this function F, a model of the target electric appliance can be identified. By applying the parameter conversion function F, data of various models of a category (for example, a microwave oven, a washer or the like) of a target electric appliance is converted into a form for which a model can be easily identified and is output as a second parameter Q.

$$Q=F\{A',S'\} \quad (6)$$

The time series data of a total current waveform and total electric power of all the electric appliances 200 installed in the house is represented by Equations (7) and (8). X represents the time series data of the total current waveform, and P represents the time series data of the total electric power. Such data is acquired by the device information acquiring unit 110. The acquired data is input from the device information acquiring unit 110 to the electric appliance detecting unit 120.

$$X=\{X_0,X_1,\ldots,X_T\} \ (T: \text{integer}) \quad (7)$$

$$P=\{P_0,P_1,\ldots,P_T\} \ (T: \text{integer}) \quad (8)$$

Equations (7) and (8) respectively represent time series data of a current waveform and time series data of electric power for T seconds from 0. A current waveform ($X_0$, $X_1$, ..., $X_T$) for each second is configured of n parameters and is represented by Equation (9).

$$X_t=\{x_1,x_2,\ldots,x_n\} \ (n: \text{integer}) \quad (9)$$

The electric appliance detecting unit 120 acquires device information (first device information) as time series data of a current waveform and electric power of a category (for example, a microwave oven, a washer or the like) of a target electric appliance from the time series data of the total current waveform and the total electric power. The electric appliance detecting unit 120 has the direct detection function of detecting time series data of a current waveform and electric power of a category (for example, a microwave oven, a washer or the like) of a target electric appliance among electric appliances installed in a house on the basis of an electric appliance waveform that is unique to the electric appliance or the electric power/current waveform disaggregating function of disaggregating time series data of a total current waveform and total electric power flowing through a distribution board for each electric appliance using a disaggregation technology and acquiring time series data of a current waveform and electric power of a category (for example, a microwave oven, a washer or the like) of a target electric appliance. By using the direct detection function or the electric power/current waveform disaggregating function included in the electric appliance detecting unit 120, the model identification system 100 can detect time series data of a current waveform and electric power of an electric appliance 200 of a target category such as a microwave oven, a washer or the like. The time series data of the current waveform and the electric power of the electric appliance 200 of the target category is represented by Equations (10) to (12). A result of the detection is input from the electric appliance detecting unit 120 to the operation extracting unit 130. $X^{(k)}$ represents time series data of a current waveform of an electric appliance 200 used in the house, and $P^{(k)}$ represents time series data of electric power of the electric appliance 200 used in the house.

$$X^{(K)}=\{X_0^{(K)},X_1^{(K)},\ldots,X_T^{(K)}\} \ (T: \text{integer}) \quad (10)$$

$$P^{(K)}=\{P_0^{(K)},P_1^{(K)},\ldots,P_T^{(K)}\} \ (T: \text{integer}) \quad (11)$$

More specifically, Equations (10) and (11) respectively represent time series data of a current waveform and time series data of electric power for T seconds from 0. A current waveform ($X_0^{(K)}$, $X_1^{(K)}$, ..., $X_T^{(K)}$) for each second is configured of n parameters and is represented by Equation (12).

$$X_t^{(K)}=\{x_0^{(K)},x_1^{(K)},\ldots,x_n^{(K)}\} \ (n: \text{integer}) \quad (12)$$

As described above, by using the direct detection function or the electric power/current waveform disaggregating function, the electric appliance detecting unit 120 can acquire the time series data of the current waveform and the electric power of an electric appliance 200 of a target category.

The direct detection function is a function of detecting time series data of a current waveform and electric power that are unique to each category of a target electric appliance such as a microwave oven, a washer or the like from data unique to electric appliances. By using the direct detection function, the electric appliance detecting unit 120, for example, can extract data from the time series data of the total current waveform and the total electric power acquired from the device information acquiring unit 110 by focusing on differences in each category of an electric appliance such as a microwave oven, a washer, a rice cooker or the like.

Instead of the direct detection function of detecting time series data of a current waveform and electric power that are unique to each of a category (for example, a microwave oven, a washer or the like) of a target electric appliance from data that is unique to electric appliances, the electric appliance detecting unit 120 may have the electric power/current waveform disaggregating function of disaggregating time series data of a total current waveform and total electric power flowing through the distribution board using a disaggregation technology and acquiring time series data of a current waveform and electric power of a category (for example, a microwave oven, a washer or the like) of a target electric appliance. More specifically, in the electric power/current waveform disaggregating function, by applying "information evaluating different points between categories of electric appliances" to a result of disaggregation of the time series data of the total current waveform and the total electric power flowing through the distribution board for each electric appliance using a disaggregation technology, time series data of a current waveform and electric power of a category of a target electric appliances can be acquired. According to the electric power/current waveform disaggregating function, by using the factorial HMM technology as a disaggregation technology, acquired digital waveform data can be disaggregated into a plurality of state variables for each time series. In addition, according to the electric power/current waveform disaggregating function, a state variable that is appropriate for the data of the same electric appliance among the disaggregated state variables can be detected. In addition, when one electric appliance is represented by a plurality of state variables, according to the electric power/current waveform disaggregating function, it can be detected that the plurality of state variables correspond to the same electric appliance. When a model is identified by disaggregating and acquiring the time series data of the current waveforms and the electric power of electric appliances using the electric power/current waveform disaggregating function, compared to the direct detection function, data having a relatively small amount of noise information can be extracted.

As described above, by applying the direct detection function included in the electric appliance detecting unit 120, features of the time series data of a current waveform and electric power that are unique to an electric appliance can be acquired. By applying the direct detection function, the electric appliance detecting unit 120, for example, can extract data focusing on differences in each category of an electric appliance such as a microwave oven, a washer, a rice cooker or the like from the time series data of a total current waveform and total electric power acquired by the device information acquiring unit 110. While the electric power of an electric appliance rises after an operation is started, on the basis of features that are unique to an electric appliance, for example, "the electric power of a microwave oven rises or drops to A W within B seconds in a tendency of a current waveform of C," operation data of a category (for example, a microwave oven, a washer or the like) of a specific electric appliance that is a target can be extracted.

In addition, instead of the direct detection function, the electric appliance detecting unit 120 can apply the electric power/current waveform disaggregating function. By applying the electric power/current waveform disaggregating function, time series data of current waveforms and electric power of a plurality of electric appliances, which are used in a house, flowing through the main part of a lamp panel of the house distribution board 1 is decomposed into a plurality of components using the disaggregation technology and can be disaggregated as information of a plurality of electric appliances.

The electric appliance detecting unit 120 may have the direct detection function or the electric power/current waveform disaggregating function. The electric appliance detecting unit 120 acquires data of an electric appliance 200 of a target category using the direction detection function or the electric power/current waveform disaggregating function in accordance with features of the electric appliance. Then, the acquired data is input to the operation extracting unit 130.

By identifying a model by directly acquiring time series data of a current waveform and electric power of a category of a target electric appliance using the direct detection function, there is an effect of decreasing the calculation cost. On the other hand, when an electric power value of an electric appliance 200 used in the house is smaller than those of the other electric appliances, it is preferable to identify a model by acquiring time series data of a current waveform and electric power of a target electric appliance by applying the electric power/current waveform disaggregating function. When a model is identified by acquiring data of a target electric appliance using the electric power/current waveform disaggregating function of decomposing data of a plurality of electric appliances, which are used in the house, acquired from the lamp panel of the house distribution board 1 into a plurality of components and disaggregating the data as information of a plurality of electric appliances, data having relatively small noise information can be extracted. Accordingly, there is an effect of identifying a target electric appliance with a high accuracy.

In this way, when a model is identified using the direct detection function and a model is identified using the electric power/current waveform disaggregating function, the effects described above are acquired and, thus, it may be configured such that one of the functions can be selected in accordance with a use. For example, it may be configured such that the electric appliance detecting unit 120 has the direct detection function and the electric power/current waveform disaggregating function, one of the functions is selected in accordance with a use. This selection, for example, is executed by a selection unit (not illustrated in the drawings) that is additionally included in the model identification system 100. Alternatively, it may be configured such that the electric appliance detecting unit 120 has a function corresponding to the selection unit, and one of the direct detection function and the electric power/current waveform disaggregating function is selected to be used using the electric appliance detecting unit 120.

The operation extracting unit 130 focuses on a specific operation of an electric appliance 200. More specifically, the operation extracting unit 130 extracts time series data of a current waveform and electric power of a specific operation section among time series data of a current waveform and electric power of an electric appliance 200 of a target category input from the electric appliance detecting unit 120. The time series data of the current waveform and the electric power of the specific operation section is represented by Equations (13) and (14) on the basis of Equations (10) to (12). For example, $X_{t1}^{(K)}$ represents current waveform data of the electric appliance 200 at a time t1, and $P_{t1}^{(K)}$ represents the electric power data of the electric appliance 200 at the time t1.

$$X^{(K)} = \{X_{t1}^{(K)}, X_{t1+1}^{(K)}, \ldots, X_{t2}^{(K)}, X_{t3}^{(K)}, X_{t3+1}^{(K)}, \ldots, X_{t4}^{(K)}\} \quad (13)$$

$$P^{(K)} = \{P_{t1}^{(K)}, P_{t1+1}^{(K)}, \ldots, P_{t2}^{(K)}, P_{t3}^{(K)}, P_{t3+1}^{(K)}, \ldots, P_{t4}^{(K)}\} \quad (14)$$

Then, a first parameter used for model identification is extracted from the time series data of the current waveform and the electric power of the specific operation section that is output from the operation extracting unit 130.

The first parameter $Y^{(k)}$ that is a feature in identifying a model is extracted on the basis of the time series data of the current waveform and the electric power of a specific operation mode that is output from the operation extracting unit 130. This extraction is executed by the feature quantity extracting unit 140, and the first parameter of the electric appliance 200 of the target category is represented by Equation (15). A result of the extraction is input from the feature quantity extracting unit 140 to the model identifying unit 150. The feature quantity extracting unit 140, for example, can extract "information required for identifying a model among microwave ovens." $X'^{(K)}$ represents the first parameter extracted from the time series data of the current waveform of the electric appliance, and $P'^{(K)}$ represents the first parameter $Y^{(K)}$ extracted from the time series data of the electric power of the electric appliance. In Equation (15), F represents a parameter conversion function. More specifically, by using the parameter conversion function F derived when the second parameter Q is extracted, data of a target electric appliance is converted by applying the time series data of a current waveform and electric power of a specific operation section that is output from the operation extracting unit 130, and resultant data is output as the first parameter $Y^{(K)}$.

$$Y^{(K)} = F\{X'^{(K)}, P'^{(K)}\} \tag{15}$$

The first parameter $Y^{(k)}$ and the second parameter Q are input to the model identifying unit 150, and, the target electric appliance that is a target is identified by comparing such parameters $Y^{(K)}$ and Q.

At this time, by configuring the time series data as model parameters using a comparison of the parameters $Y^{(K)}$ and Q as the result of the conversion at a vector distance or hidden Markov models (HMM), degrees of similarity are calculated and compared with each other, whereby the target electric appliance can be identified. This comparison is executed by the model identifying unit 150. A method of comparing parameters will be described later.

Figure 5:
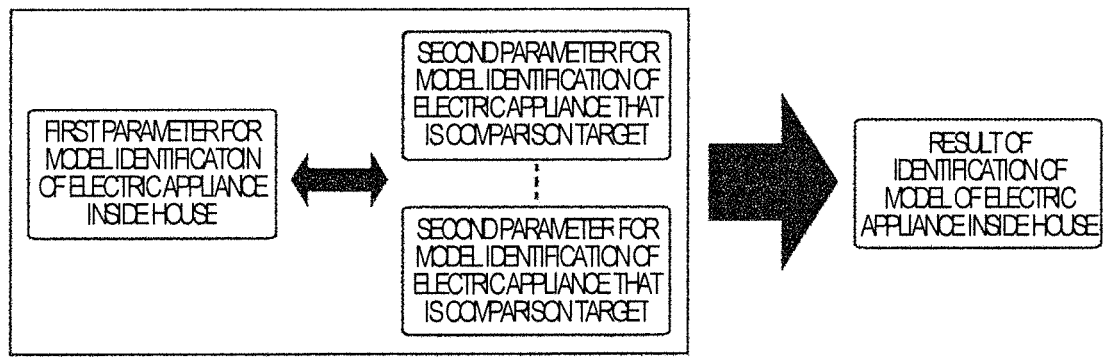
FIG. 5 is a schematic diagram illustrating one example of a model identifying process of a model identification system according to Example 1.

Next, one example of the method of identifying a model using the model identification system 100 will be described with reference to the drawings. FIG. 5 is a schematic diagram illustrating one example of a model identifying process of the model identification system 100 according to Example 1.

The model identifying unit 150 compares the first parameter of a specific electric appliance 200 with the second parameter of an electric appliance that is a comparison target using the method described above, determines a degree of similarity (for example, a likelihood, a vector distance, or a COS similarity) between the parameters, and when the degree of similarity satisfies a predetermined threshold condition, determines the specific electric appliance 200 is the same model as that of the electric appliance that is the comparison target.

In addition, when there are a plurality of electric appliances of which degrees of similarity satisfy the predetermined threshold condition, all the models may be determined to be the same appliance. By outputting all the electric appliances having the possibility of being the same appliance, retrieval omission can be suppressed. For example, it is effective when a device to be recalled is detected.

Alternatively, when there are a plurality of electric appliances of which degrees of similarity satisfy the predetermined threshold condition, an electric appliance having a largest value of the degree of similarity among the plurality of electric appliances may be determined as being the same appliance. It is effective when one result is required, for example, that a market survey (market share survey) is performed.

Figure 6:
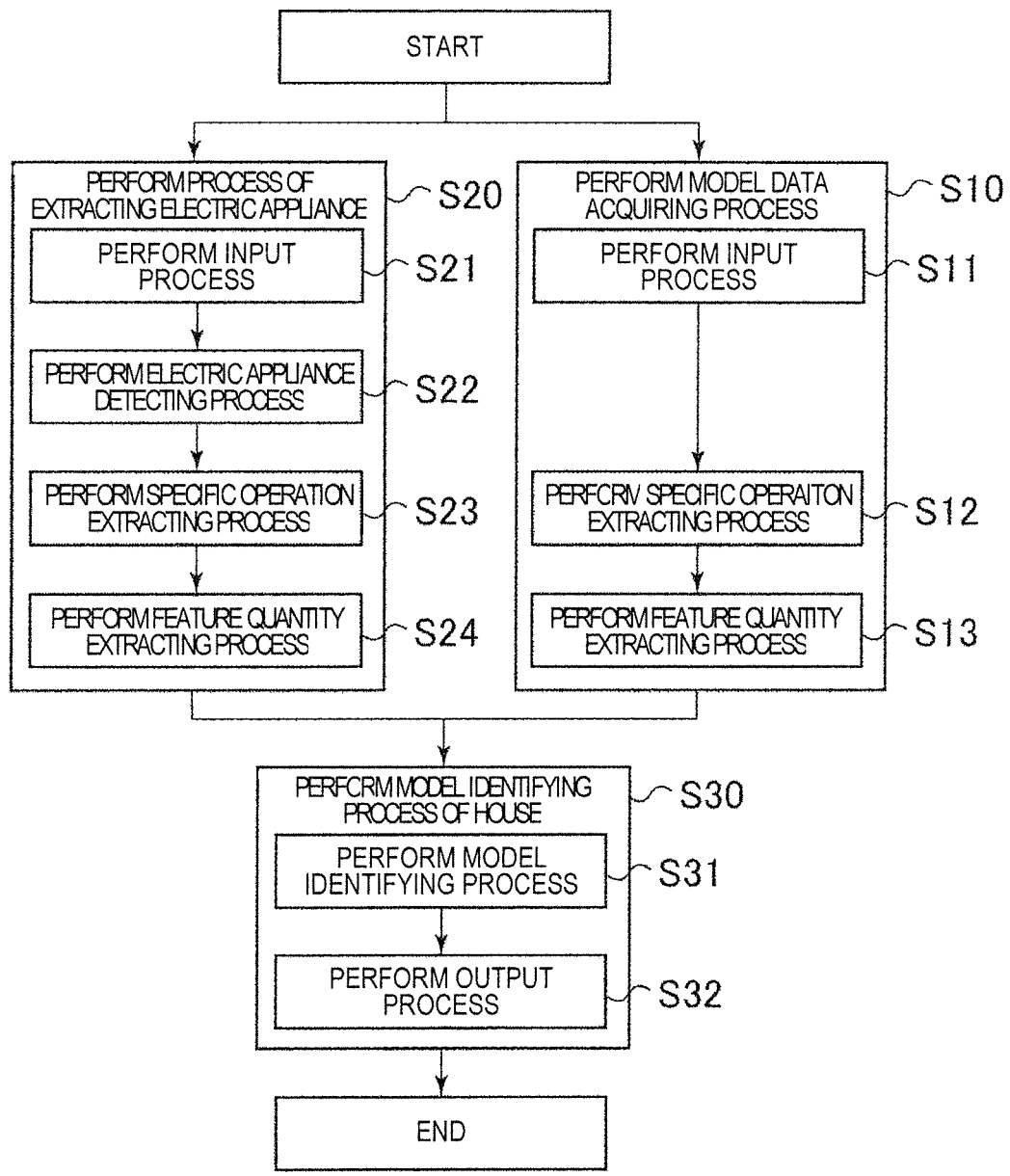
FIG. 6 is a flowchart illustrating one example of the processing flow of a model identification system according to Example 1.

Next, one example of the processing flow of the model identification system 100 will be described with reference to the drawings. FIG. 6 is a flowchart illustrating one example of the processing flow of the model identification system according to Example 1.

As illustrated in FIG. 6, the model identification system 100 according to Example 1 identifies an electric appliance through a model data acquiring process step (S10), an electric appliance extracting process step (S20), and a model identifying process step (S30).

First, in the model data acquiring process step (S10), time series data of a current waveform and electric power of an electric appliance that is a comparison target is acquired as an input process (S11). More specifically, time series data of a current waveform and electric power of an electric appliance that is a comparison target is input to the device information acquiring unit 110. For example, the device information acquiring unit 110 acquires data of various models of the category (for example, a microwave oven, a washer or the like) of a target electric appliance. The data is stored in a memory (not illustrated in the drawings) included in the device information acquiring unit 110.

Next, time series data of a current waveform and electric power of a specific operation section used in model identification is acquired from the data of the electric appliance, which is the comparison target, acquired in S11 as the specific operation extracting process (S12). For example, when the category of the target electric appliance is a microwave oven, the electric appliance detecting unit 120 extracts data of several tens of seconds before and after the start of an operation of the microwave function from the acquired data of the microwave oven.

Next, a second parameter that is a feature in identifying a model is extracted from the time series data of the current waveform and the electric power of the specific operation section that is acquired in S12 as the feature quantity extracting process (S13). The second parameter is extracted by converting the data of various models of the category (for example, a microwave oven, a washer or the like) of the target electric appliance into a form for which the model can be easily identified by applying the parameter conversion function F. This acquisition can be processed by the feature quantity extracting unit 140. The feature quantity extracting unit 140 derives the parameter conversion function F required to specify a model by applying the machine learning function, converts data of various models of the category (for example, a microwave oven, a washer or the like) of the target electric appliance into a form for which a model can be easily identified, and outputs resultant data as a second parameter.

In the electric appliance extracting process step (S20), first, time series data of a total current waveform and total electric power of electric appliances installed in the house is acquired as device information from the lamp panel of the house distribution board 1 as an input process (S21). The acquisition can be processed by the device information acquiring unit 110.

Next, data of each category (for example, a microwave oven, a washer or the like) of the target electric appliance is acquired from the device information acquired in S21 as the electric appliance detecting process (S22). More specifically, the electric appliance detecting unit 120 can detect time series data of a current waveform and electric power of the category (for example, a microwave oven, a washer or the like) of the target electric appliance installed in the house on the basis of an electric appliance waveform that is unique to the electric appliance by applying the direct detection function. Alternatively, the electric appliance detecting unit 120 can detect time series data of a current waveform and electric power of the category (for example, a microwave oven, a washer or the like) of the target electric appliance by applying "information evaluating different points between categories of electric appliances" to a result acquired by disaggregating time series data of a total current waveform and total electric power flowing through the distribution board for each electric appliance using a disaggregation technology by applying the electric power/current waveform disaggregating function.

Next, time series data of a current waveform and electric power of a specific operation section used for model identification from the device information of the target electric appliance that is acquired in S22 as the specific operation extracting process (S23). For example, data of an operation section before and after the start of an operation for each category (for example, a microwave oven, a washer or the like) of the target electric appliance can be acquired. This acquisition can be process by the operation extracting unit 130.

Next, a first parameter that is a feature point in identifying a model is extracted from the time series data of the current waveform and the electric power of the specific operation section for each category of the target electric appliance that is acquired in S23 as the feature point extracting process (S24). This acquisition can be processed by the feature quantity extracting unit 140. More specifically, in the model data acquiring process step described above, the parameter conversion function F derived by using the machine learning function in the feature quantity extracting unit 140 is applied to the time series data of the current waveform and the electric power of the specific operation section of the category of the target electric appliance extracted in S23, whereby a first parameter is extracted. In more detail, information required to identify a model belonging to the category of the target electric appliance (first parameter) is extracted with the data of the specific operation section of the category (for example, a microwave oven, a washer or the like) of the target electric appliance extracted by the operation extracting unit 130 being focused on.

Then, in the model identifying process step (S30), a model name, a manufacturer name, a product name and the like of the electric appliance of the specific category used in the house are identified from the first parameter and the second parameter extracted in the model data acquiring process step (S10) and the electric appliance extracting process step (S20) (S31), and the model name, the manufacturer name, the product name, and the like are output (S32).

For example, models having possibilities of being used in the house may be output as a list table of electric appliances. Thus, there is an effect of specifying a model in a state in which there is no retrieval missing or no retrieval omission of electric appliances needed to be recollected like in the case of detection of devices to be recalled or the like.

In addition, an electric appliance that is closest to an electric appliance used in the house can be output as well. When electric appliances used in each house need to be acquired like in a market survey (share survey) or the like, there is an effect of being capable of specifying the electric appliances with a high accuracy.

The output form of the electric appliances described above may be arbitrary selected in accordance with the use. This selection can be processed by the model identifying unit 150. In addition, a method of outputting electric appliances is not limited to such a form. The method of outputting electric appliances can be variously selected such as outputting five high-ranked models in accordance with the use.

Subsequently, one example of a device identifying process program of the model identification system 100 according to Example 1 will be described.

The model identification system 100 realizes a device information acquiring function, an electric appliance detecting function, an operation extracting function, a feature quantity extracting function, and a device identifying function in a computer.

In the device information acquiring function, device information as time series data of a total current waveform and total electric power of all the electric appliances 200 installed in a house and device information (second device information) as time series data of a current waveform and electric power of each electric appliance that is a comparison target are acquired. This function can be realized by the device information acquiring unit 110.

In the electric appliance detecting function, device information (first device information) as time series data of a current waveform and electric power of the category (for example, a microwave oven, a washer or the like) of the target electric appliance is acquired from the time series data of a total current waveform and total electric power of all the electric appliances installed in the house. The electric appliance detecting function includes a direct detection function of detecting time series data of a current waveform and electric power of the category (for example, a microwave oven, a washer or the like) of the target electric appliance installed in a house on the basis of an electric appliance waveform that is unique to the electric appliance or the electric power/current waveform disaggregating function of disaggregating and acquiring time series data of a current waveform and electric power of the category (for example, a microwave oven, a washer or the like) of the target electric appliance for each electric appliance using a disaggregation technology. In the direct detection function, by directly applying "information evaluating different points between categories of electric appliances" to a measured value acquired from the lamp panel of the house distribution board, time series data of a current waveform and electric power of each category (for example, a microwave oven, a washer or the like) of target electric appliances is acquired. In the electric power/current waveform disaggregating function, by applying "information evaluating different points between categories of electric appliances" to a result of disaggregation of the time series data of the total current waveform and the total electric power flowing through the distribution board for each electric appliance using a disaggregation technology, similar to the direct detection function, time series data of a current waveform and electric power of the category (for example, a microwave oven, a washer or the like) of the target electric appliance is acquired. In accordance with the use, one of the direct detection function and the electric power/current waveform disaggregating function is selected as being applied to acquire data of target electric appliances. By applying the direct detection function or the electric power/current waveform disaggregating function, data of an operation part that is unique to an electric appliance is acquired. This function can be realized by the electric appliance detecting unit 120.

In the operation extracting function, time series data of a current waveform and electric power of the category of the target electric appliance acquired by the electric appliance detecting function is narrowed down into a specific operation section that is effective in identifying a model, and time series data of a current waveform and electric power of the category of the target electric appliance is acquired. In the operation extracting function, data of a specific operation section is extracted for the device information (second device information) acquired using the device information acquiring function or the device information (first device information) detected using the electric appliance detecting function. For example, when a target category of electric appliances is a microwave oven, an operation section in which different points distinctively appear for each model of a microwave oven is extracted. More specifically, data is narrowed down into a specific operation section in which a rise tendency of electric power, a change in the current waveform, and the like are different for each model in a target category (for example, a microwave oven, a washer or the like) of electric appliances and is acquired. This function can be realized by the operation extracting unit 130.

In the feature quantity extracting function, parameters (the first parameter and the second parameter) that are features in identifying an electric appliance are extracted on the basis of the data of the specific operation section of the target electric appliance extracted using the operation extracting function. This function can be realized by the feature quantity extracting unit 140.

In the model identifying function, a model (a model name, a manufacturer name a product name or the like) of an electric appliance used in the house is identified on the basis of each of the parameters extracted using the feature quantity extracting function. More specifically, a model is identified using the degree of similarity between the parameters. This function can be realized by the model identifying unit 150.

In this way, according to the model identification system, the model identification method, and the model identification program of Example 1, retrieved electric appliances can be appropriately identified by specifying a model name, a manufacturer name, and a product name of each electric appliance.

Example 2

Example 2 is an example of when an electric appliance is identified using not only feature quantities of a current waveform and electric power, but also voltage information including a high-frequency component of a voltage waveform. A model identification system 100 according to Example 2, for example, performs identification of an electric appliance with a high-frequency component of a voltage waveform being additionally taken into consideration, and accordingly, a model can be identified with a higher accuracy.

The voltage waveform included in the voltage information does not necessarily need to be a high-frequency component, and a low-frequency component or the like may be used. Hereinafter, an example of when a model is identified using a high-frequency component of a voltage waveform as voltage information will be used for description. In addition, it is apparent that, a current waveform may be current information including the current waveform. Hereinafter, description will be presented using an example of when a model is identified using a current waveform as current information.

A configuration example of the model identification system 100 according to Example 2 is similar to the configuration example of the model identification system 100 according to Example 1 illustrated in FIGS. 1 and 2 and, thus, detailed description thereof will not be presented. In Example 2, the model identification system 100 has a function of extracting features of electric appliances from time series data of current waveforms, electric power, and high-frequency components of voltage waveforms of a plurality of the electric appliances installed in each room in a house and performing model identification of specifying a model, a manufacturer name, a product name and the like of each of the electric appliances on the basis of the features.

According to the model identification system 100, for example, time series data of a current waveform, electric power, and a high-frequency component of a voltage waveform when the microwave oven operates and changes in the time series data of the current waveform, the electric power, and a high-frequency component of a voltage waveform before and after the air conditioner operates can be acquired and, accordingly, features that are unique to each electric appliance can be extracted.

In the model identification system 100 according to Example 2, a high-frequency component of a voltage waveform, for example, is measured by a sensor 410 of a distribution board 1, and the measured data is transmitted to the model identification system 100. The sensor 410 and the model identification system 100 are interconnected through a communication line, and the model identification system 100 can extract a high frequency component of a voltage waveform.

A configuration example of a main part of the model identification system according to Example 2 is similar to the configuration example of the main part of the model identification system according to Example 1 illustrated in FIG. 3.

The model identification system 100 identifies an electric appliance through a model data acquiring process step of acquiring model data that is a comparison target when the model of the electric appliance 200 is identified, an electric appliance extracting process step of extracting features of the electric appliance 200 in the house, and a model identifying process step of identifying models of electric appliances used in the house on the basis of the model data acquiring process step and the electric appliance extracting process step.

As illustrated in FIG. 3, an example is illustrated in which the model identification system 100 includes a device information acquiring unit 110 (device information acquiring function), an electric appliance detecting unit 120 (electric appliance detecting function), an operation extracting unit 130 (operation extracting function), a feature quantity extracting unit 140 (feature quantity extracting function), and a model identifying unit 150 (model identifying function).

First, the model data acquiring process step will be described.

Model Data Acquiring Process Step

The device information acquiring unit 110 acquires data of a plurality of electric appliances that are comparison targets when a model of an electric appliance 200 used in the house is identified. More specifically, time series data of a current waveform, electric power, and a high-frequency component of a voltage waveform of each of electric appliances that are comparison targets are input to the device information acquiring unit 110 as device information (second device information). To input data to the device information acquiring unit 110, for example, data is measured using a measurement sensor such as an Ampere meter, a Watt-hour meter, or a voltmeter, and the measured data is input. Various kinds of data of a target electric appliance, for example, time series data of current waveforms, electric power, and high-frequency components of voltage waveforms of microwave functions of all the models of microwave ovens are input to the device information acquiring unit 110. The device information acquiring unit 110, for example, acquires device information through a communication line such as a mobile telephone network or the like. In Example 2, a high-frequency component of a voltage waveform can be directly measured from that of the distribution board 410. In other words, as a value of the high-frequency component of the voltage waveform, that of the distribution board 410 may be used. The reason for this is that it is difficult for a feature quantity of the high-frequency component of the voltage waveform to be influenced by other electric appliances of which currents flow through the distribution board 410.

In addition, regarding the high-frequency component of the voltage waveform, instead of the distribution board 410, in the house illustrated in FIG. 1, by connecting a predetermined sensor (not illustrated in the drawings) that can measure a voltage waveform to a power supply unit (in other words, a plug connector for wiring (for example, an insertion plug, an outlet, a cord connector body, or a multi-tap)) that can receive supply of electric power, the high-frequency component of the voltage waveform may be measured. Since a voltage waveform is approximately the same in any part of a wiring in the house, the voltage waveform may be measured at any one place (for example, an arbitrary outlet installed in the house) of the wiring in the house. A predetermined sensor measuring a high-frequency component of a voltage waveform measures the high-frequency component of the voltage waveform from an arbitrary outlet installed in the house, connects the voltage waveform to the sensor 410 in a wireless or wired manner, and notifies the high-frequency component of the voltage waveform to the sensor 410. Hereinafter, when a voltage waveform is acquired from the distribution board will be described as an example.

The operation extracting unit 130 extracts data of a specific operation section of an electric appliance from time series data of a current waveform, electric power, and a high-frequency component of a voltage waveform used to identify a model of the electric appliance, which is a comparison target, acquired by the device information acquiring unit 110. The data of a specific operation section represents data of the specific operation section having a specific operation mode as its start point in accordance with the features of an electric appliance for effectively identifying a model of the electric appliance 200. The operation extracting unit 130 extracts the data of the specific operation section having the specific operation mode as its start point. The specific operation mode represents an operation part in which a different point is distinctively represented among time series data of current waveforms, electric power, and high-frequency components of voltage waveforms between models in model identification for an electric appliance 200. The operation extracting unit 130, for example, extracts time series data of current waveforms, electric power, and high-frequency components of voltage waveforms before and after the start of the operation of a microwave function of each of microwave ovens of all the models.

The feature quantity extracting unit 140 extracts a parameter used for model identification that becomes a feature point in identifying a model from time series data of a current waveform, electric power, and a high-frequency component of a voltage waveform of a specific operation section of an electric appliance, which is a comparison target, extracted by the operation extracting unit 130 as a second parameter. To effectively use the second parameter having a specific operation mode as its start point when the model of the electric appliance 200 is identified, by using a machine learning function included in the feature quantity extracting unit 140, a parameter conversion function that is necessary to specify a model of an electric appliance, which is a target, is derived from time series data of current waveforms, electric power, and high-frequency components of voltage waveforms of specific operation section of various models. Then, a parameter that is effective in specifying a model is extracted, and a second model parameter that is appropriate to identify a model is specified for each model. In other words, the feature quantity extracting unit 140 converts time series data of a current waveform, electric power, and a high-frequency component of a voltage waveform into a form in which a model of a target category (for example, a microwave oven, a washer or the like) of an electric appliance can be easily identified. The feature quantity extracting unit 140, for example, converts data into a form in which a model of an electric appliance can be easily identified, for example, it can be easily identified whether a microwave oven is "microwave oven A" or "microwave oven B." More specifically, the feature quantity extracting unit 140 converts data of various models of a category (for example, a microwave oven, a washer or the like) of a target electric appliance into a form in which a model can be easily identified by applying the parameter conversion function to be described later, and the converted data is output as a second parameter.

The feature quantity extracting unit 140 samples the time series data acquired by the device information acquiring unit 110 a plurality of times by using the machine learning function and extracts a second parameter that is appropriate in identifying a model from among a plurality of sampled parameters.

The machine learning function has a component decomposing function of decomposing time series data into components. The machine learning function has a function of decomposing time series data on the basis of the component decomposing function and converting the time series data into a second parameter that characterizes a different point between models of electric appliances 200. The component decomposing function decomposes time series data into a common component between models and a unique component.

The conversion of data into a parameter that characterizes a different point between models using the component decomposing function, for example, similar to Example 1, is executed using a principal component analysis (PCA), a Non-Negative matrix factorization (NMF) method by projected gradient, a factor analysis (FA) method, a fastICA method, an akaLSA method, a sparse coding method, a dictionary learning method or the like.

In addition, the machine learning function has a regression analysis function of analyzing a distinctive component of time series data. The machine learning function analyzes time series data on the basis of the regression analysis function and can extract a component that is important in identifying a model of an electric appliance 200.

The extraction of an important component for identifying a model using the regression analysis function, for example, is executed using a gradient boosting method, an aka extra-trees method, a random forest method or the like.

As described above, the feature quantity extracting unit 140 can convert data into a second parameter that characterizes different points between models using the component decomposing function and extract an important component for model identification. For this reason, the feature quantity extracting unit 140 can extract a second parameter that is appropriate for identifying a model among a plurality of sampled second parameters.

Next, the electric appliance extracting process step will be described.

Electric Appliance Extracting Process Step

The device information acquiring unit 110 acquires device information as time series data of a total current waveform, total electric power, and the high-frequency component of the voltage waveform of electric appliances 200 used in a house in addition to second device information of each of electric appliances kv that are comparison targets described above. The device information acquiring unit 110 acquires the device information from a lamp panel of a house distribution board 1. More specifically, the device information acquiring unit 110 acquires device information of all the electric appliances 200, which are installed in the house, at predetermined intervals.

The device information, for example, represents information used to specify a use state or a usage amount of electric power of an electric appliance such as time series data of a current waveform, electric power, and a high-frequency component of a voltage waveform. The device information acquiring unit 110 measures a time series data of a total current waveform, total electric power, and a high-frequency component of a total voltage waveform supplied from the lamp panel of the house distribution board 1 using a sensor installed in the house. The device information is stored in a memory (not illustrated in the drawings) included in the device information acquiring unit 110. In addition, the device information may be stored in a storage unit (not illustrated in the drawings) that is additionally included in the model identification system 100.

The electric appliance detecting unit 120 detects device information (first device information) used to identify models of the electric appliances 200 from the time series data of the total current waveform, the total electric power, and a high-frequency component of a total voltage waveform acquired by the device information acquiring unit 110. More specifically, the electric appliance detecting unit 120 has a direct detection function of detecting time series data of a current waveform, electric power, and a high-frequency component of a voltage waveform of an electric appliance 200 installed in the house for the time series data of the total current waveform, the total electric power, and the high-frequency component of the total voltage waveform acquired by the device information acquiring unit 110. For example, the electric appliance detecting unit 120 can detect time series data of a current waveform, electric power, and a high-frequency component of a voltage waveform of an electric appliance 200 from an operation start time point to an operation end time point on the basis of a feature that is unique to the electric appliance by using the direct detection function.

In addition, instead of the direct detecting function of detecting time series data of a current waveform and electric power of an electric appliance 200 used in the house from the time series data of a total current waveform and total electric power, the electric appliance detecting unit 120 may have an electric power/current waveform disaggregating function of decomposing time series data of current waveforms and electric power of a plurality of electric appliances used in the house acquired from the lamp panel of the house distribution board 1 into a plurality of components, disaggregating the components as information of a plurality of electric appliances, and acquiring time series data of a current waveform and electric power corresponding to a specific electric appliance 200 from among them. According to the electric power/current waveform disaggregating function, for example, by using a factorial hidden Markov model (HMM) technology, time series data of a total current waveform and total electric power used in a house can be decomposed into a plurality of components and can be disaggregated as information of a plurality of electric appliances. In addition, when an operation end point from the start of an operation of the electric appliance 200 is determined, the high-frequency component of the voltage waveform can be directly acquired from the distribution board, an outlet or the like and, accordingly, even when the electric power/current waveform disaggregating function is used, the electric appliance can be identified with the high-frequency component of the voltage waveform additionally taken into account.

By using the direct detection function or the electric power/current waveform disaggregating function, the electric appliance detecting unit 120 acquires device information (first device information) as time series data of a current waveform, electric power, and a high-frequency component of a voltage waveform of each category (for example, a microwave oven, a washer or the like) of target electric appliances from time series data of a total current waveform, total electric power, and a high-frequency component of a total voltage waveform of all the electric appliances installed in the house. As a value of the high-frequency component of the voltage waveform, a value acquired from the distribution board is directly used. In addition, the high-frequency component of the voltage waveform may be acquired from an outlet or the like installed in the house.

The electric appliance detecting unit 120 has the direct detection function of detecting time series data of current waveforms, electric power, and high-frequency components of voltage waveforms of a target category (for example, a microwave oven, a washer or the like) of electric appliances installed in the house on the basis of electric appliance waveforms that are unique to the electric appliances. In addition, the electric appliance waveform may include current information or voltage information. The high-frequency component of the voltage waveform may be used to detect time series data of a current waveform or electric power of a television set, a microwave oven or the like. As a value of the high frequency component of the voltage waveform, a value acquired from the distribution board, an outlet or the like may be directly used. In addition, the electric appliance detecting unit 120 has the electric power/current waveform disaggregating function of disaggregating time series data of a total current waveform and total electric power flowing through the distribution board for each electric appliance using a disaggregation technology and acquiring time series data of a current waveform and electric power of the target category (for example, a microwave oven, a washer or the like) of electric appliances.

In the direct detection function, by directly applying "information evaluating different points between categories of electric appliances" to a measured value acquired from the lamp panel 1 of the house distribution board, time series data of a current waveform and electric power of each category (for example, a microwave oven, a washer or the like) of target electric appliances is acquired. As a value of the high frequency component of the voltage waveform, a value acquired from the distribution board, an outlet or the like may be directly used. In the electric power/current waveform disaggregating function, by applying "information evaluating different points between categories of electric appliances" to a result of disaggregation of the time series data of the total current waveform and the total electric power flowing through the distribution board using a disaggregation technology, time series data of a current waveform and electric power of a category (for example, a microwave oven, a washer or the like) of a target electric appliance is acquired. Then, in accordance with the use, one of the direct detection function and the waveform disaggregating function is selected as being applied to acquire data of target electric appliances. By applying the direct detection function or the waveform disaggregating function, data of an operation part that is unique to an electric appliance is acquired.

Figure 7:
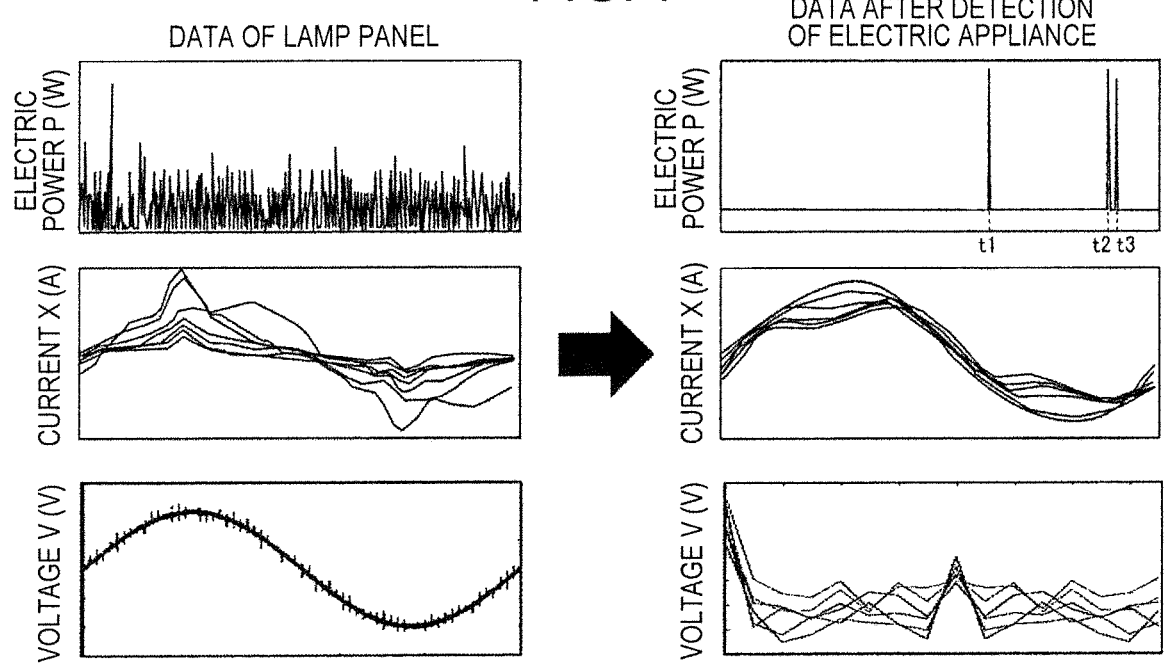
FIG. 7 illustrates graphs representing time series data of a current waveform, electric power, and a high-frequency component of a voltage waveform in a lamp panel of a distribution board according to Example 2.

Next, a method of detecting time series data of current waveforms, electric power, and high-frequency components of voltage waveforms of electric appliances 200 used in a house using the electric appliance detecting unit 120 will be described with reference to the drawings. FIG. 7 illustrates graphs representing time series data of a current waveform, electric power, and a high-frequency component of a voltage waveform in a lamp panel of the house distribution board 1.

Left diagrams illustrate time series data of a total current waveform, total electric power, and a high-frequency component of a total voltage waveform of all the electric appliances installed in a house that are measured by the lamp panel of the house distribution board 1. In addition, right diagrams illustrate results of detection of time series data of a current waveform, electric power, and a high-frequency component of a voltage waveform of a specific electric appliance 200 among operating electric appliances among the time series data of the total current waveform and the total electric power acquired by applying the direct detection function or the electric power/current waveform disaggregating function. As a value of the high frequency component of the voltage waveform, a value acquired from the distribution board, an outlet or the like may be directly used. In this example, results of detection of time series data of a current waveform, electric power, and a high-frequency component of a voltage waveform of a washer among time series data of a total current waveform and total electric power of all the electric appliances are illustrated as an example.

In the lamp panel of the house distribution board 1, for example, data corresponding to one week is continuously measured at every predetermined period and can be output as graph data. The vertical axes respectively represent a current value X, electric power value P, and a voltage value V. By applying the direct detection function included in the electric appliance detecting unit 120 to the data measured in this way, time series data of a current waveform and electric power of electric appliances 200 of a target category such as a microwave oven, a washer or the like can be detected from features of the time series data of a current waveform, electric power, and a high-frequency component of a voltage waveform that are unique to each category of electric appliances. In addition, depending on the category, time series data of a current waveform, electric power, and a high-frequency component of a voltage may be detected. As a value of the high frequency component of the voltage waveform, a value acquired from the house distribution board 1 may be directly used. In addition, by applying the electric power/current waveform disaggregating function, the electric appliance detecting unit 120 disaggregates time series data of current waveforms and electric power flowing through electric appliances from the time series data of current waveforms and electric power flowing through the main part of the house distribution board 1 using a disaggregation technology and can detect time series data of a current waveform and electric power of each type of electric appliance 200. In addition, when an operation end point from the start of an operation of the electric appliance 200 is determined, the high-frequency component of the voltage waveform can be directly acquired from the distribution board, an outlet or the like and, accordingly, even when the electric power/current waveform disaggregating function is used, the electric appliance can be identified with the high-frequency component of the voltage waveform additionally taken into account. In this way, the electric appliance detecting unit 120 can extract the time series data of a current waveform, electric power, and a high-frequency component of a voltage waveform of electric appliances 200 of a target category such as a microwave oven, a washer or the like. According to the waveform disaggregating function, data of all the electric appliances installed in the house can be disaggregated, and data of a specific category (for example, a microwave oven, a washer or the like) of electric appliances that are targets among them can be extracted.

In right diagrams in FIG. 7, an example is illustrated in which a power value P rises at a time t1, a time t2, and a time t3, and electric appliances are used three times a week. The electric appliance detecting unit 120 may also directly detect data from data corresponding to one week illustrated in the left drawings by applying the direct detection function to data from operation start to operation end illustrated in the right diagrams. Alternatively, the electric appliance detecting unit 120 may disaggregate and detect data by applying the electric power/current waveform disaggregating function. When the power consumption is relatively low and set as having a regulated value or less, it is preferable to use the electric power/current waveform disaggregating function in extracting time series data of a current waveform and electric power of a specific operating electric appliance. In addition, in the right diagram in FIG. 7, a voltage value V represents time series changes in the high frequency component of a voltage waveform that is acquired by performing parameter conversion of a voltage waveform illustrated in the left diagram in FIG. 7 using fast Fourier transform (FFT) for a predetermined voltage waveform of one second. On the other hand, for an electric appliance having high power consumption, time series data of a current waveform, electric power, and a high frequency component of a voltage waveform may be directly detected without using the waveform disaggregating function. When a model is identified by directly acquiring time series data of a current waveform, electric power, and a high-frequency component of a voltage waveform of an electric appliance by using the direct detection function, there is an effect of decreasing the calculation cost.

In this way, the electric appliance detecting unit 120, for example, by using the features of electric appliances of various categories such as a microwave oven, a washer and the like, in other words, "information evaluating different points between categories of electric appliances," can acquire time series data of a current waveform, electric power, and a high-frequency component of a voltage waveform of each category of target electric appliances such as a microwave oven, a washer or the like that is a target.

Then, the electric appliance detecting unit 120 delivers the detected time series data of current waveforms, electric power, and high-frequency components of voltage waveforms used for identifying a model of the electric appliance 200 to the operation extracting unit 130.

The operation extracting unit 130 narrows down time series data of a current waveform, electric power, and a high-frequency component of a voltage waveform for each category of electric appliances 200 detected by the electric appliance detecting unit 120 into a specific operation section that is effective in identifying a model and extracts time series data of current waveforms, electric power, and high-frequency components of voltage waveforms of electric appliances 200 of a target category. For example, when a target category of electric appliances is a microwave oven, an operation section in which different points distinctively appear for each model of a microwave oven is extracted. More specifically, data is narrowed down into a specific operation section in which a rise tendency of electric power, a change in the current waveform, a change in the high-frequency component of the voltage waveform and the like are different for each model in a target category (for example, a microwave oven, a washer or the like) of electric appliances and is acquired. Data of a specific operation section represents data of the specific operation section having a specific operation mode as its start point in accordance with features of electric appliances to effectively identify models of electric appliances 200. The operation extracting unit 130 extracts data of the specific operation section having the specific operation mode as its start point. The specific operation mode represents an operation part in which different points distinctively appear between models of an electric appliance 200 in time series data of a current waveform, electric power, and a high-frequency component of a voltage waveform.

In more details, the specific operation section represents a section in which a difference in tendency of time series data of a current waveform, electric power, and a high-frequency component of a voltage waveform between models in a target category of electric appliances is likely to occur. For example, the specific operation section represents a section in which, for a specific electric appliance, when the electric appliance operates, a tendency of time series data of a current waveform, time series data of electric power, and a high-frequency component of a voltage waveform distinctively appears compared to that of an electric appliance of a different model of the same category.

In addition, the specific operation mode, for example, represents a mode that represents an operation of an "microwave function" of when an electric heater-attached microwave oven is used as a microwave oven and an "oven function" of when the electric heater-attached microwave oven is used as a gas oven in a case in which an operation of the electric heater-attached microwave oven among electric appliances 200 is to be identified. In addition, for a washer, a mode representing an operation of a part other than an operation part of a dryer may be the specific operation mode.

In addition, data of a specific operation section having a specific operation mode at its start point, for example, for a category of electric appliances that periodically operate, represents data of a period from the start of one operation to the end thereof and, for a category of electric appliances having strong distinctiveness for each model before and after the start of an operation, data of several tens of seconds before and after the start of the operation.

As described above, the operation extracting unit 130 narrows down time series data of the current waveform, time-series data of the electric power, and time series data of a high-frequency component of the voltage waveform of electric appliances extracted by the electric appliance detecting unit 120 into a specific operation section effective in identifying a model and extracts the time series data of the current waveform, the time-series data of the electric power, and the time series data of a high-frequency component of the voltage waveform of the specific operation section. For example, when a category of target electric appliances is the microwave oven, data of several tens of seconds before and after the start of an operation of the microwave function is extracted from the time series data of a current waveform, time series data of electric power, and time series data of a high-frequency component of a voltage waveform of the microwave oven extracted by the electric appliance detecting unit 120 as "information evaluating different points of the microwave oven."

Then, the operation extracting unit 130 delivers the extracted data of the specific operation section to the feature quantity extracting unit 140.

The feature quantity extracting unit 140 extracts a parameter used for model identification that is a feature point for identifying a model from the time series data of the current waveform, the time-series data of the electric power, and the time series data of the high-frequency component of the voltage waveform used to identify the model, which is extracted by the operation extracting unit 130, as a first parameter. Then, to effectively use the first parameter extracted from the specific operation section when the model of the electric appliance 200 is identified, an effective parameter is extracted using the machine learning function included in the feature quantity extracting unit 140, and a first model parameter that is appropriate for identifying a model can be specified. More specifically, in the model data acquiring process step, a parameter conversion function calculated by applying the machine learning function is applied to the time series data of the current waveform, the time series data of the electric power, and the time series data of a high-frequency component of a voltage waveform of the specific operation section of electric appliances 200 of a target category, which is extracted by the operation extracting unit 130, and the data is converted into a form in which a model can be easily identified and is output as a first parameter. In this way, by focusing on the specific operation section of the category (for example, a microwave oven, a washer or the like) of a target electric appliance that is target extracted by the operation extracting unit 130, the feature quantity extracting unit 140 can extract information to identify a model among the microwave ovens as a first parameter.

The machine learning function samples the data of a specific operation section, which is extracted by the operation extracting unit 130, a plurality of times and extracts a first parameter that is appropriate in identifying a model among a plurality of sampled parameters.

In addition, a first parameter that is effective in identifying a model may be manually input on the basis of features of an electric appliance 200, and the parameter that is appropriate to identify a model may be extracted for each electric appliance as a first model parameter.

Alternatively, by combining the above-described first model parameter specified using the machine learning function and the above-described first model parameter input manually, a first model parameter that is appropriate for identifying a model may be extracted. This extraction is executed by the feature quantity extracting unit 140.

In this way, when the first parameter is manually input, and a first model parameter that is appropriate to identify a model is extracted for each electric appliance, similar to the first parameter, the second parameter may be manually input, and a second model parameter that is appropriate for identifying a model may be extracted for each electric appliance.

Then, by combining the second model parameter specified using the machine learning function and the above-described second model parameter input manually, a second model parameter that is appropriate to identify a model may be extracted. This extraction is executed by the feature quantity extracting unit 140.

As described above, by extracting a model parameter by combining a model parameter specified by the machine learning function and a model parameter designated through manual input, there is an effect of more appropriately identifying a model of a target electric appliance.

Next, the model identifying process step will be described.

Model Identifying Process Step

In the model identifying process step, a model of a target electric appliance is identified on the basis of feature quantities of a plurality of kinds of electric appliances, which are acquired and extracted in the model data acquiring process step and the electric appliance extracting process step and are comparison targets, and feature quantities of an electric appliance 200 that is used in the house. The identification of a model is executed by the model identifying unit 150 included in the model identification system 100. By comparing the first parameter and the second parameter, which are acquired and extracted in the model data acquiring process step and the electric appliance extracting process step, with each other, a model of the electric appliance 200 used in the house is identified. More specifically, a degree of similarity between the parameters is calculated and compared to a threshold that is a criterion to determine the same appliance or not.

The degree of similarity, for example, is calculated using a likelihood and a vector distance between parameters. In addition, a means of calculating the degree of similarity is not limited to the calculation of a likelihood or a vector distance. The degree of similarity may be calculated using a Euclidean distance, a Mahalanobis distance, a Manhattan distance, a Chebyshev distance, a Minkowski distance, a cosine (Cos) similarity, a Pearson's correlation coefficient, a deviation pattern similarity or the like, and the degree of similarity may be calculated by combining some thereof.

By configuring time series data as a model parameter using hidden Markov models (HMM), a likelihood can be calculated. The HMM is a data model that represents a sequence as transitions among states having an occurrence model according to a probability distribution and calculates a likelihood in accordance with the probability distribution. The HMM has a characteristic of being strong against noise and thus is effective as a model identifying process of analyzing time series data generated in accordance with an electric appliance and executing model identification.

For example, in identifying a model of an electric appliance 200 used in a house, degrees of similarity for a plurality of kinds of electric appliances that are comparison targets are calculated. For example, when the degree of similarity is calculated using a vector distance between parameters, an electric appliance having a shortest vector distance is output as the electric appliance 200. Alternatively, when the likelihood has a predetermined value or more, the electric appliance may be configured to be output as a candidate for a model of a target electric appliance 200. In such a case, it is preferable for the device information acquiring unit 110 to acquire a large amount of electric appliance data that is a comparison target in advance.

As described above, according to the model identification system 100 of this example, an electric appliance that is appropriate for a parameter model of the same electric appliance can be detected and, accordingly, a marked effect of being capable of identifying a model with a high accuracy is acquired.

Next, a method of calculating a parameter using the model identification system 100 according to an example will be described more specifically.

Method of Calculating Parameter

The time series data of a current waveform, electric power, and a high-frequency component of a voltage waveform of an electric appliance that is a comparison target when an electric appliance 200 is to be identified is represented by Equations (20) to (22). "A" represents current waveform data of an operation part of an electric appliance that is a comparison target, and "S" represents electric power data of an operation part of the electric appliance that is the comparison target. V represents voltage waveform data of a high-frequency component of a voltage in an operation part of an electric appliance that is a comparison target. In addition, a time from the start of an operation of the electric appliance to the end of the operation is represented as endτ. The data is acquired by the device information acquiring unit 110. The device information acquiring unit 110 acquires data of various models of a category (for example, a microwave oven, a washer or the like) of a target electric appliance.

$$A = \{A_0, A_1, \ldots, A_{end\tau}\} \quad (20)$$

$$S = \{S_0, S_1, \ldots, S_{end\tau}\} \quad (21)$$

$$V = \{V_0, V_1, \ldots, V_{end\tau}\} \quad (22)$$

Equations (20) to (22) respectively represent time series data of a current waveform, time series data of electric power, and time series data of a high-frequency component of a voltage waveform for endτ seconds from "0." A current waveform ($A_0, A_1, \ldots, A_{end\tau}$) for each second is configured of n parameters and represented by Equation (24).

$$A_\tau = \{a_0, a_1, \ldots, a_n\} \quad (n: \text{integer}) \quad (24)$$

In addition, a high-frequency component ($V_0, V_1, \ldots, V_{end\tau}$) of a voltage waveform for each second is configured of m parameters and represented by Equation (25).

$$V_\tau = \{v_0, v_1, \ldots, v_m\} \quad (m: \text{integer}) \quad (25)$$

The data of a model is input to the operation extracting unit 130.

The time series data of a current waveform, electric power, and a high-frequency component of a voltage waveform of an electric appliance, which is a comparison target when the electric appliance 200 is to be identified, in a specific operation mode is represented by Equations (26) to (28). Such data is extracted by the operation extracting unit 130. A' represents current waveform data of an electric appliance that is a comparison target in a specific operation section, and S' represents electric power data of the electric appliance that is a comparison target in a specific operation section. In addition, V' represents voltage waveform data in a specific operation section of the electric appliance that is a comparison target.

$$A' = \{A_{\tau 1}, A_{\tau 1+1}, \ldots, A_{\tau 2}, A_{\tau 3}, A_{\tau 3+1}, \ldots, A_{\tau 4}\} \quad (26)$$

$$S' = \{S_{\tau 1}, S_{\tau 1+1}, \ldots, S_{\tau 2}, S_{\tau 3}, S_{\tau 3+1}, \ldots, S_{\tau 4}\} \quad (27)$$

$$V' = \{V_{\tau 1}, V_{\tau 1+1}, \ldots, V_{\tau 2}, V_{\tau 3}, V_{\tau 3+1}, \ldots, V_{\tau 4}\} \quad (28)$$

On the basis of the time series data of the current waveform, the electric power, the high-frequency component of the voltage waveform of the electric appliance that is a comparison target in a specific operation section, which is output from the operation extracting unit 130, a second parameter that is a feature in identifying a model is extracted. This extraction is executed by the feature quantity extracting unit 140, and the second parameter Q of the electric appliance that is a comparison target when the electric appliance 200 is to be identified is represented by Equation (29). A result of the extraction is input from the feature quantity extracting unit 140 to the model identifying unit 150. In Equation (29), F represents a parameter conversion function. More specifically, by applying the machine learning function included in the feature quantity extracting unit 140, a function F required to specify a model is derived from time series data of current waveforms and electric power of various models in a specific operation section. By inputting time series data of each waveform of a category (for example, a microwave oven, a washer or the like) of a target electric appliance in a specific operation section to this function F, a model of the target electric appliance can be identified. By applying the parameter conversion function F, data of various models of a category (for example, a microwave oven, a washer or the like) of a target electric appliance is converted into a form for which a model can be easily identified and is output as a second parameter Q.

$$Q = F\{A', S', V'\} \tag{29}$$

The time series data of a total current waveform, total electric power, and a high-frequency component of a total voltage waveform of all the electric appliances 200 installed in the house is represented by Equations (30) to (32). X represents the time series data of the total current waveform, and P represents the time series data of the total electric power. Such data is acquired by the device information acquiring unit 110. The acquired data is input from the device information acquiring unit 110 to the electric appliance detecting unit 120.

$$X = \{X_0, X_1, \ldots, X_T\} \ (T: \text{integer}) \tag{30}$$

$$P = \{P_0, P_1, \ldots, PT\} \ (T: \text{integer}) \tag{31}$$

$$Z = \{Z_0, Z_1, \ldots, Z_T\} \ (T: \text{integer}) \tag{32}$$

Equations (30) to (32) respectively represent time series data of a current waveform, time series data of electric power, and time series data of a high-frequency component of a voltage waveform for T seconds from 0. A current waveform $(X_0, X_1, \ldots, X_T)$ for each second is configured of n parameters and represented by Equation (33).

$$X_t = \{x_1, x_2, \ldots, x_n\} \ (n: \text{integer}) \tag{33}$$

In addition, a high-frequency component of a voltage waveform $(Z_0, Z_1, \ldots, Z_T)$ for each second is configured of m parameters and represented by Equation (34).

$$Z_t = \{z_1, z_2, \ldots, z_m\} \ (m: \text{Integer}) \tag{34}$$

The electric appliance detecting unit 120 acquires device information (first device information) as time series data of a current waveform, electric power, and a high-frequency component of a voltage waveform of a category (for example, a microwave oven, a washer or the like) of a target electric appliance from the time series data of the total current waveform, the total electric power, and the high-frequency component of the total voltage waveform. The electric appliance detecting unit 120 has the direct detection function of detecting time series data of a current waveform, electric power, and a high-frequency component of a voltage waveform of the category (for example, a microwave oven, a washer or the like) of a target electric appliance among electric appliances installed in a house on the basis of an electric appliance waveform that is unique to the electric appliance. Alternatively, the electric appliance detecting unit 120 has a waveform disaggregating function of disaggregating time series data of a total current waveform and total electric power flowing through a distribution board for each electric appliance using an electric power/current disaggregation technology and acquiring time series data of a current waveform and electric power of the category (for example, a microwave oven, a washer or the like) of a target electric appliance.

By using the direct detection function or the electric power/current waveform disaggregating function included in the electric appliance detecting unit 120, the model identification system 100 can detect time series data of a current waveform, electric power, and a high-frequency component of a voltage waveform of an electric appliance 200 of a target category such as a microwave oven, a washer or the like. The time series data of the current waveform and the electric power and the high-frequency component of the voltage of the electric appliance 200 of the target category is represented by Equations (35) to (37). A result of the detection is input from the electric appliance detecting unit 120 to the operation extracting unit 130. $X^{(k)}$ represents time series data of a current waveform of an electric appliance 200 used in the house, and $P^{(k)}$ represents time series data of electric power of the electric appliance 200 used in the house. In addition, $Z^{(k)}$ represent time series data of a high-frequency component of a voltage waveform of an electric appliance 200 used in the house.

$$X^{(K)} = \{X_0^{(K)}, X_1^{(K)}, \ldots, X_T^{(K)}\} \ (T: \text{integer}) \tag{35}$$

$$P^{(K)} = \{P_0^{(K)}, P_1^{(K)}, \ldots, P_T^{(K)}\} \ (T: \text{integer}) \tag{36}$$

$$Z^{(K)} = \{Z_0^{(K)}, Z_1^{(K)}, \ldots, Z_T^{(K)}\} \ (T: \text{integer}) \tag{37}$$

More specifically, Equations (35) to (37) respectively represent time series data of a current waveform and time series data of electric power for T seconds from 0. A current waveform $(X_0^{(K)}, X_1^{(K)}, \ldots, X_T^{(K)})$ for each second is configured of n parameters and is represented by Equation (38).

$$X_t^{(K)} = \{x_0^{(K)}, x_1^{(K)}, \ldots, x_n^{(K)}\} \ (n: \text{integer}) \tag{38}$$

In addition, a high-frequency component $(Z_0^{(K)}, Z_1^{(K)}, \ldots, Z_T^{(K)})$ of a voltage waveform for each second is configured of m parameters and represented by Equation (39).

$$Z_t^{(K)} = \{z_0^{(K)}, z_1^{(K)}, \ldots, z_n^{(K)}\} \ (m: \text{integer}) \tag{39}$$

As described above, the electric appliance detecting unit 120 can acquire the time series data of the current waveform, the electric power, and a high-frequency component of the voltage waveform of an electric appliance 200 of a target category.

The direct detection function is a function of detecting time series data of a current waveform, electric power, and a high-frequency component of a voltage waveform that are unique to each category of a target electric appliance such as a microwave oven, a washer or the like from data unique to electric appliances. By using the direct detection function, the electric appliance detecting unit 120, for example, can extract data from the time series data of the total current waveform, the total electric power, and a high-frequency component of the total voltage waveform acquired from the device information acquiring unit 110 by focusing on differences in each category of an electric appliance such as a microwave oven, a washer, a rice cooker or the like.

Instead of the direct detection function of detecting time series data of a current waveform, electric power, and a high-frequency component of a voltage waveform that are unique to each of a category (for example, a microwave oven, a washer or the like) of a target electric appliance from data that is unique to electric appliances, the electric appliance detecting unit 120 may have the electric power/current waveform disaggregating function of disaggregating time series data of a total current waveform and total electric power flowing through the distribution board using a disaggregation technology and acquiring time series data of a current waveform and electric power of a category (for example, a microwave oven, a washer or the like) of a target electric appliance. In addition, when an operation end point from the start of an operation of the electric appliance 200 is determined, the high-frequency component of the voltage waveform can be directly acquired from the distribution board, an outlet or the like and, accordingly, even in a case in which the electric power/current waveform disaggregating function is used, the electric appliance can be identified with the high-frequency component of the voltage waveform additionally taken into account.

More specifically, in the electric power/current waveform disaggregating function, by applying "information evaluating different points between categories of electric appliances" to a result of disaggregation of the time series data of the total current waveform and the total electric power flowing through the distribution board for each electric appliance using a disaggregation technology, time series data of a current waveform and electric power of a category of a target electric appliances can be acquired. According to the electric power/current waveform disaggregating function, by using the factorial HMM technology as a disaggregation technology, acquired digital waveform data can be disaggregated into a plurality of state variables for each time series. In addition, according to the electric power/current waveform disaggregating function, a state variable that is appropriate for the data of the same electric appliance among the disaggregated state variables can be detected. In addition, when one electric appliance is represented by a plurality of state variables, according to the electric power/current waveform disaggregating function, it can be detected that the plurality of state variables correspond to the same electric appliance. When a model is identified by disaggregating and acquiring the time series data of the current waveforms and the electric power of electric appliances using the electric power/current waveform disaggregating function, compared to the direct detection function, data having a relatively small amount of noise information can be extracted.

As described above, the electric appliance detecting unit 120 can acquire features of the time series data of a current waveform, electric power, and a high-frequency component of a voltage waveform that are unique to an electric appliance can be acquired. By applying the direct detection function, the electric appliance detecting unit 120, for example, can extract data focusing on differences in each category of an electric appliance such as a microwave oven, a washer, a rice cooker or the like from the time series data of a total current waveform, total electric power, and a high-frequency component of a total voltage waveform acquired by the device information acquiring unit 110. While the electric power of an electric appliance rises after an operation is started, on the basis of features that are unique to an electric appliance, for example, "the electric power of a microwave oven rises or drops to A W within B seconds in a tendency of a current waveform of C," operation data of a category (for example, a microwave oven, a washer or the like) of a specific electric appliance that is a target can be extracted.

In addition, instead of the direct detection function, the electric appliance detecting unit 120 can apply the electric power/current waveform disaggregating function. By applying the electric power/current waveform disaggregating function, time series data of current waveforms and electric power of a plurality of electric appliances, which are used in a house, flowing through the main part of a lamp panel of the house distribution board 1 is decomposed into a plurality of components using the disaggregation technology and can be disaggregated as information of a plurality of electric appliances.

The electric appliance detecting unit 120 may have the direct detection function or the electric power/current waveform disaggregating function. The electric appliance detecting unit 120 acquires data of an electric appliance 200 of a target category using the direction detection function or the electric power/current waveform disaggregating function in accordance with features of the electric appliance. Then, the acquired data is input to the operation extracting unit 130.

By identifying a model by directly acquiring time series data of a current waveform, electric power, and a high-frequency component of a voltage waveform of a category of a target electric appliance using the direct detection function, there is an effect of decreasing the calculation cost. On the other hand, when an electric power value of an electric appliance 200 used in the house is smaller than those of the other electric appliances, it is preferable to identify a model by acquiring time series data of a current waveform and electric power of a target electric appliance by applying the electric power/current waveform disaggregating function. When a model is identified by acquiring data of a target electric appliance using the electric power/current waveform disaggregating function of decomposing data of a plurality of electric appliances, which are used in the house, acquired from the lamp panel of the house distribution board 1 into a plurality of components and disaggregating the data as information of a plurality of electric appliances, data having relatively small noise information can be extracted. Accordingly, there is an effect of identifying a target electric appliance with a high accuracy.

In this way, when a model is identified using the direct detection function and when a model is identified using the electric power/current waveform disaggregating function, the effects described above are acquired and, thus, it may be configured such that one of the functions can be selected in accordance with a use. For example, it may be configured such that the electric appliance detecting unit 120 has the direct detection function and the electric power/current waveform disaggregating function, one of the functions is selected in accordance with the use. This selection, for example, is executed by a selection unit (not illustrated in the drawings) that is additionally included in the model identification system 100. Alternatively, it may be configured such that the electric appliance detecting unit 120 has a function corresponding to the selection unit, and one of the direct detection function and the electric power/current waveform disaggregating function is selected to be used with the electric appliance detecting unit 120.

The operation extracting unit 130 focuses on a specific operation of an electric appliance 200. More specifically, the operation extracting unit 130 extracts time series data of a current waveform, electric power, and a high-frequency component of a voltage waveform of a specific operation section among time series data of a current waveform, electric power, and a high-frequency component of a voltage waveform of an electric appliance 200 of a target category input from the electric appliance detecting unit 120. The time series data of the current waveform, the electric power, and a high-frequency component of the voltage waveform of the specific operation section is represented by Equations (40) to (42) on the basis of Equations (35) to (39) described above. For example, $X_{t1}^{(K)}$ represents current waveform data of the electric appliance 200 at a time t1, and $P_{t1}^{(K)}$ represents the electric power data of the electric appliance 200 at the time t1. In addition, $Z_{t1}^{(K)}$ represents voltage waveform data of a high-frequency component of a voltage of the electric appliance 200 at a time t1.

$$X^{(K)} = \{X_{t1}^{(K)}, X_{t1+1}^{(K)}, \ldots, X_{t2}^{(K)}, X_{t3}^{(K)}, X_{t3+1}^{(K)}, \ldots, X_{t4}^{(K)}\} \quad (40)$$

$$P^{(K)} = \{P_{t1}^{(K)}, P_{t1+1}^{(K)}, \ldots, P_{t2}^{(K)}, P_{t3}^{(K)}, P_{t3+1}^{(K)}, \ldots, P_{t4}^{(K)}\} \quad (41)$$

$$Z^{(K)} = \{Z_{t1}^{(K)}, Z_{t1+1}^{(K)}, \ldots, Z_{t2}^{(K)}, Z_{t3}^{(K)}, Z_{t3+1}^{(K)}, \ldots, Z_{t4}^{(K)}\} \quad (42)$$

Then, a first parameter used for model identification is extracted from the time series data of the current waveform, the electric power, and a high-frequency component of the voltage waveform of the specific operation section that is output from the operation extracting unit 130.

The first parameter $Y^{(k)}$ that is a feature in identifying a model is extracted on the basis of the time series data of the current waveform, the electric power, and a high-frequency component of the voltage waveform of a specific operation mode that is output from the operation extracting unit 130. This extraction is executed by the feature quantity extracting unit 140, and the first parameter of the electric appliance 200 of the target category is represented by Equation (43). A result of the extraction is input from the feature quantity extracting unit 140 to the model identifying unit 150. The feature quantity extracting unit 140, for example, can extract "information required for identifying a model among microwave ovens." $X'^{(K)}$ represents the first parameter $Y^{(K)}$ extracted from the time series data of the current waveform of the electric appliance, and $P'^{(K)}$ represents the first parameter $Y^{(K)}$ extracted from the time series data of the electric power of the electric appliance. In addition, $Z'^{(K)}$ represents the first parameter $Y^{(K)}$ extracted from the time series data of a high-frequency component of the voltage waveform of the electric appliance. In Equation (43) described above, F represents a parameter conversion function. More specifically, by using the parameter conversion function F derived when the second parameter Q is extracted, data of a target electric appliance is converted by applying the time series data of a current waveform and electric power of a specific operation section that is output from the operation extracting unit 130, and resultant data is output as the first parameter $Y^{(K)}$.

$$Y^{(K)} = F\{X^{(K)}, P^{(K)}, Z^{(K)}\} \quad (43)$$

The first parameter $Y^{(k)}$ and the second parameter Q are input to the model identifying unit 150, and, the target electric appliance that is a target is identified by comparing such parameters $Y^{(K)}$ and Q.

At this time, by configuring the time series data as model parameters using a comparison of the parameters $Y^{(K)}$ and Q as the result of the conversion at a vector distance or hidden Markov models (HMM), degrees of similarity are calculated and compared with each other, whereby the target electric appliance can be identified. This comparison is executed by the model identifying unit 150. A method of comparing parameters will be described later.

One example of the method of identifying a model using the model identification system 100 according to Example 2 is similar to one example of the processing method according to Example 1 illustrated in FIG. 5.

The model identifying unit 150 compares the first parameter of a specific electric appliance 200 with the second parameter of an electric appliance that is a comparison target using the method described above, determines a degree of similarity (for example, a likelihood, a vector distance, or a COS similarity) between the parameters and, when the degree of similarity satisfies a predetermined threshold condition, determines the specific electric appliance 200 is the same model as that of the electric appliance that is the comparison target.

In addition, when there are a plurality of electric appliances of which degrees of similarity satisfy the predetermined threshold condition, all the models may be determined to be the same appliance. By outputting all the electric appliances having the possibility of being the same appliance, retrieval omission can be suppressed. For example, it is effective when a device to be recalled is detected.

Alternatively, when there are a plurality of electric appliances of which degrees of similarity satisfy the predetermined threshold condition, an electric appliance having a largest value of the degree of similarity among the plurality of electric appliances may be determined as being the same appliance. It is effective when one result is required, for example, when a market survey (market share survey) is performed.

Although one example of the processing flow of the model identification system 100 according to Example 2 is similar to the processing flow of the model identification system 100 according to Example 1 illustrated in FIG. 6, there are parts in which details of processes corresponding to each other are different, and thus, the processing flow will be described with reference to FIG. 6.

As illustrated in FIG. 6, the model identification system 100 according to Example 2 identifies an electric appliance through a model data acquiring process step (S10), an electric appliance extracting process step (S20), and a model identifying process step (S30).

First, in the model data acquiring process step (S10), time series data of a current waveform and electric power of an electric appliance that is a comparison target is acquired as an input process (S11). More specifically, time series data of a current waveform, electric power, and a high-frequency component of a voltage waveform of an electric appliance that is a comparison target is input to the device information acquiring unit 110. For example, the device information acquiring unit 110 acquires data of various models of the category (for example, a microwave oven, a washer or the like) of a target electric appliance. The data is stored in a memory (not illustrated in the drawings) included in the device information acquiring unit 110.

Next, time series data of a current waveform, electric power, and a high-frequency component of a voltage waveform of a specific operation section used in model identification is acquired from the data of the electric appliance, which is the comparison target, acquired in S11 as the specific operation extracting process (S12). For example, when the category of the target electric appliance is a microwave oven, the electric appliance detecting unit 120 extracts data of several tens of seconds before and after the start of an operation of the microwave function from the acquired data of the microwave oven.

Next, a second parameter that is a feature in identifying a model is extracted from time series data of a high-frequency component of a voltage waveform in addition to the time series data of the current waveform and the electric power of the specific operation section that is acquired in S12 as the feature quantity extracting process (S13). The second parameter is extracted by converting the data of various models of the category (for example, a microwave oven, a washer or the like) of the target electric appliance into a form for which the model can be easily identified by applying the parameter conversion function F. This acquisition can be processed by the feature quantity extracting unit 140. The feature quantity extracting unit 140 derives the parameter conversion function F required to specify a model by applying the machine learning function, converts data of various models of the category (for example, a microwave oven, a washer or the like) of the target electric appliance into a form for which a model can be easily identified, and outputs resultant data as a second parameter.

In the electric appliance extracting process step (S20), first, time series data of a total current waveform, total electric power, and a high-frequency component of a total voltage waveform of electric appliances installed in the house is acquired as device information from the lamp panel of the house distribution board 1 as an input process (S21). The acquisition can be processed by the device information acquiring unit 110.

Next, data of each category (for example, a microwave oven, a washer or the like) of the target electric appliance is acquired from the device information acquired in S21 as the electric appliance detecting process (S22). More specifically, the electric appliance detecting unit 120 can detect time series data of a current waveform, electric power, and a high-frequency component of a voltage waveform of the category (for example, a microwave oven, a washer or the like) of the target electric appliance installed in the house on the basis of an electric appliance waveform that is unique to the electric appliance by applying the direct detection function. Alternatively, the electric appliance detecting unit 120 can detect time series data of a current waveform and electric power of the category (for example, a microwave oven, a washer or the like) of the target electric appliance by applying "information evaluating different points between categories of electric appliances" to a result acquired by disaggregating the time series data of a total current waveform and total electric power flowing through the distribution board for each electric appliance using a disaggregation technology by applying the electric power/current waveform disaggregating function.

Next, time series data of a current waveform, electric power, and a high-frequency component of a voltage waveform of a specific operation section used for model identification is acquired from the device information of the target electric appliance that is acquired in S22 as the specific operation extracting process (S23). For example, data of an operation section before and after the start of an operation for each category (for example, a microwave oven, a washer or the like) of the target electric appliance can be acquired. This acquisition can be process by the operation extracting unit 130.

Next, a first parameter that is a feature point in identifying a model is extracted from the time series data of a high-frequency component of the voltage waveform in addition to the time series data of the current waveform and the electric power of the specific operation section for each category of the target electric appliance as the feature point extracting process (S24). This acquisition can be processed by the feature quantity extracting unit 140. More specifically, in the model data acquiring process step described above, the parameter conversion function F derived by using the machine learning function in the feature quantity extracting unit 140 is applied to the time series data of the current waveform, the electric power, and a high-frequency component of the voltage waveform of the specific operation section of the category of the target electric appliance that is extracted in S23, whereby a first parameter is extracted. In more detail, information required to identify a model belonging to the category of the target electric appliance (first parameter) is extracted with the data of the specific operation section of the category (for example, a microwave oven, a washer or the like) of the target electric appliance extracted by the operation extracting unit 130 being focused on.

Then, in the model identifying process step (S30), a model name, a manufacturer name, a product name and the like of the electric appliance of the specific category used in the house are identified from the first parameter and the second parameter extracted in the model data acquiring process step (S10) and the electric appliance extracting process step (S20) (S31), and the model name, the manufacturer name, the product name and the like are output (S32).

For example, models having possibilities of being used in the house may be output as a list table of electric appliances. Thus, there is an effect of specifying a model in a state in which there is no retrieval missing or no retrieval omission of electric appliances needed to be recollected as in detection of devices to be recalled or the like.

In addition, an electric appliance that is closest to an electric appliance used in the house can be output as well. When electric appliances used in each house need to be acquired like in the case of a market survey (share survey) or the like, there is an effect of being capable of specifying the electric appliances with a high accuracy.

The output form of the electric appliances described above may be arbitrary selected in accordance with the use. This selection can be processed by the model identifying unit 150. In addition, a method of outputting electric appliances is not limited to such a form. The method of outputting electric appliances can be variously selected such as outputting five high-ranked models in accordance with the use.

Subsequently, one example of a device identifying process program of the model identification system 100 according to Example 2 will be described.

The model identification system 100 realizes a device information acquiring function, an electric appliance detecting function, an operation extracting function, a feature quantity extracting function, and a device identifying function in a computer.

In the device information acquiring function, device information as time series data of a total current waveform, total electric power, and a high-frequency component of a total voltage waveform of all the electric appliances 200 installed in a house and device information (second device information) as time series data of a current waveform, electric power, and a high-frequency component of a voltage waveform of each electric appliance that is a comparison target are acquired. This function can be realized by the device information acquiring unit 110.

In the electric appliance detecting function, device information (first device information) as time series data of a current waveform, electric power, and a high-frequency component of a voltage waveform of the category (for example, a microwave oven, a washer or the like) of the target electric appliance is acquired from the time series data of a total current waveform, total electric power, and a high-frequency component of a total voltage waveform of all the electric appliances installed in the house. The electric appliance detecting function includes a direct detection function of detecting time series data of a current waveform, electric power, and a high-frequency component of a voltage waveform of the category (for example, a microwave oven, a washer or the like) of the target electric appliance installed in a house on the basis of an electric appliance waveform that is unique to the electric appliance or the electric power/current waveform disaggregating function of disaggregating and acquiring time series data of a current waveform and electric power of the category (for example, a microwave oven, a washer or the like) of the target electric appliance for each electric appliance using a disaggregation technology. In the direct detection function, by directly applying "information evaluating different points between categories of electric appliances" to a measured value acquired from the lamp panel of the house distribution board, time series data of a current waveform, electric power, and a high-frequency component of a voltage waveform of each category (for example, a microwave oven, a washer or the like) of target electric appliances is acquired. In the electric power/current waveform disaggregating function, by applying "information evaluating different points between categories of electric appliances" to a result of disaggregation of the time series data of the total current waveform and the total electric power flowing through the distribution board for each electric appliance using a disaggregation technology, similar to the direct detection function, time series data of a current waveform and electric power of the category (for example, a microwave oven, a washer or the like) of the target electric appliance is acquired. In addition, when an operation end point from the start of an operation of the electric appliance 200 is determined, the high-frequency component of the voltage waveform can be directly acquired from the distribution board, an outlet or the like and, accordingly, even in a case in which the electric power/current waveform disaggregating function is used, the electric appliance can be identified with the high-frequency component of the voltage waveform additionally taken into account. In accordance with the use, one of the direct detection function and the electric power/current waveform disaggregating function is selected as being applied to acquire data of target electric appliances. By applying the direct detection function or the electric power/current waveform disaggregating function, data of an operation part that is unique to an electric appliance is acquired. This function can be realized by the electric appliance detecting unit 120.

In the operation extracting function, time series data of a current waveform, electric power, and a high-frequency component of a voltage waveform of the category of the target electric appliance acquired by the electric appliance detecting function is narrowed down into a specific operation section that is effective in identifying a model, and time series data of a current waveform, electric power, and a high-frequency component of a voltage waveform of the category of the target electric appliance and is acquired. In the operation extracting function, data of a specific operation section is extracted for the device information (second device information) acquired using the device information acquiring function or the device information (first device information) detected using the electric appliance detecting function. For example, when a target category of electric appliances is a microwave oven, an operation section in which different points distinctively appear for each model of a microwave oven is extracted. More specifically, data is narrowed down into a specific operation section in which a rise tendency of electric power, a change in the current waveform, a high-frequency component of the voltage waveform and the like are different for each model in a target category (for example, a microwave oven, a washer or the like) of electric appliances and is acquired. This function can be realized by the operation extracting unit 130.

In the feature quantity extracting function, parameters (the first parameter and the second parameter) that are features in identifying an electric appliance are extracted on the basis of the data of the specific operation section of the target electric appliance extracted using the operation extracting function. This function can be realized by the feature quantity extracting unit 140.

In the model identifying function, a model (a model name, a manufacturer name, a product name or the like) of an electric appliance used in the house is identified on the basis of each of the parameters extracted using the feature quantity extracting function. More specifically, a model is identified using the degree of similarity between the parameters. This function can be realized by the model identifying unit 150.

In this way, according to the model identification system, the model identification method, and the model identification program, retrieved electric appliances can be appropriately identified by specifying a model name, a manufacturer name, and a product name of each electric appliance.

As described above, Example 2 is an example of when an electric appliance is identified using not only the feature quantities of the current waveform and the electric power but also a voltage waveform (for example, a high-frequency component of the voltage waveform). In Example 2, an electric appliance is identified using a high-frequency component of the voltage waveform in addition to the feature quantities of the current waveform and the electric power. The model identification system 100 according to Example 2 identifies an electric appliance with the high-frequency component of the voltage waveform additionally taken into account and, accordingly, model identification having a higher accuracy can be performed.

As described above, while the model identification system, the model identification method, and the model identification program according to the examples have been described in detail, this disclosure is not limited to the examples described above, and various improvements or modifications may be made therein in a range not departing from the scope of the appended claims.

The invention claimed is:
1. A model identification system comprising:
a device information acquirer that acquires device information used to identify a model of an electric device;
an operation extractor that extracts data of a predetermined operation section on the basis of the device information acquired by the device information acquirer;
a feature quantity extractor that extracts a parameter used to identify the electric device on the basis of the data of the predetermined operation section of the electric device extracted by the operation extractor; and
a model identifier that identifies a model of a used electric device on the basis of the parameter of the electric device extracted by the feature quantity extractor, wherein the feature quantity extractor performs a machine learning process by sampling the data of the predetermined operation section extracted from the operation extractor a plurality of times, extracts a parameter corresponding to each sampling, and extracts a parameter appropriate to identify a model among a plurality of sampled parameters.

2. The model identification system according to claim 1, wherein the parameter includes a first parameter that specifies the electric device and a second parameter representing an electric device that is a comparison target of the electric device, and
the model identifier identifies the model of the electric device by comparing the first parameter to the second parameter.

3. The model identification system according to claim 2, wherein the model identifier evaluates a degree of similarity between the first parameter and the second parameter.

4. The model identification system according to claim 2, wherein the device information acquirer additionally acquires:
first device information including time series data of a current waveform and electric power of an operating electric device among time series data of a total current waveform and total electric power of the electric device that is measured by a distribution board; and
second device information including time series data of a current waveform and electric power of another electric device that is a comparison target of the electric device, and
wherein the feature quantity extractor extracts the first parameter corresponding to each electric device on the basis of the first device information and extracts the second parameter on the basis of the second device information.

5. The model identification system according to claim 4, wherein the first device information includes time series data of voltage information including a high-frequency component of a voltage waveform in addition to the time series data of the current waveform and the electric power of the operating electric device,
the second device information includes time series data of voltage information including a high-frequency component of a voltage waveform in addition to the time series data of the current waveform and the electric power of the another electric device that is the comparison target of the electric device, and
the feature quantity extractor extracts the first parameter corresponding to each electric device on the basis of the first device information and extracts the second parameter on the basis of the second device information.

6. The model identification system according to claim 2, wherein the model identifier calculates a degree of similarity between parameters on the basis of the first parameter and the second parameter acquired by the feature quantity extractor, specifies the electric device having a highest degree of similarity among the calculated degrees of similarity, and identifies a model of the specified electric device as the target electric device.

7. The model identification system according to claim 2, wherein the model identification system additionally has a direct detection function of directly acquiring changed parts of time series data of a current waveform and electric power that are unique to a category of the electric device or an electric power/current waveform disaggregating function of decomposing time series data of a total current waveform and total electric power supplied to a plurality of electric devices into components of the plurality of electric devices and disaggregating and acquiring time series data of a current waveform and electric power corresponding to a category of a specific electric device, and
the model identifier analyzes the time series data of the current waveform and the electric power of the category of the electric device using the direct detection function or the electric power/current waveform disaggregating function and identifies features of the time series data of the current waveform and the electric power corresponding to a model of a target electric device.

8. The model identification system according to claim 7, wherein the direct detection function is additionally capable of directly acquiring voltage information including a high-frequency component of a voltage waveform unique to the category of the electric device, and
the model identifier identifies features of time series data of a current waveform, electric power, and voltage information including a high-frequency component of a voltage waveform corresponding to a model of a target electric device with time series data of the voltage information including the high-frequency component of the voltage waveform taken into account.

9. The model identification system according to claim 1, wherein the model identification system additionally has a direct detection function of directly acquiring changed parts of time series data of a current waveform and electric power that are unique to a category of the electric device or an electric power/current waveform disaggregating function of decomposing time series data of a total current waveform and total electric power supplied to a plurality of electric devices into components of the plurality of electric devices and disaggregating and acquiring time series data of a current waveform and electric power corresponding to a category of a specific electric device, and
the model identifier analyzes the time series data of the current waveform and the electric power of the category of the electric device using the direct detection function or the electric power/current waveform disaggregating function and identifies features of the time series data of the current waveform and the electric power corresponding to a model of a target electric device.

10. The model identification system according to claim 9, wherein the direct detection function is additionally capable of directly acquiring voltage information including a high-frequency component of a voltage waveform unique to the category of the electric device, and
the model identifier identifies features of time series data of a current waveform, electric power, and voltage information including a high-frequency component of a voltage waveform corresponding to a model of a target electric device with time series data of the voltage information including the high-frequency component of the voltage waveform taken into account.

11. A model identification method comprising:
a) acquiring device information used to identify a model of an electric device;
b) extracting data of a predetermined operation section on the basis of the device information acquired in step a);

c) extracting a parameter used to identify the electric device on the basis of the data of the predetermined operation section of the electric device extracted in step b); and
d) identifying a model of a used electric device on the basis of the parameter of the electric device extracted in step c), wherein, in step c), a machine learning process is performed by sampling the data of the predetermined operation section extracted from step b) a plurality of times, a parameter corresponding to each sampling is extracted, and a parameter appropriate to identify a model among a plurality of sampled parameters is extracted.

12. A non-transitory computer readable medium recording a model identification program causing a computer to execute the steps of:
   a) acquiring device information used to identify a model of an electric device;
   b) extracting data of a predetermined operation section on the basis of the device information acquired by step a);
   c) extracting a parameter used to identify the electric device on the basis of the data of the predetermined operation section of the electric device extracted by step b); and
   d) identifying a model of a used electric device on the basis of the parameter of the electric device extracted using the feature quantity extracting function by step c), wherein step c) performs a machine learning process by sampling the data of the predetermined operation section extracted by step b) a plurality of times, extracts a parameter corresponding to each sampling, and extracts a parameter that is appropriate to identify a model among a plurality of sampled parameters.

* * * * *